United States Patent
Mochizuki et al.

(10) Patent No.: US 12,388,943 B2
(45) Date of Patent: Aug. 12, 2025

(54) PRINTING SYSTEM USING FLUORESENT AND NON-FLUORESENT INK, PRINTING APPARATUS, IMAGE PROCESSING APPARATUS, IMAGE PROCESSING METHOD, AND CONTROL METHOD THEREOF

(71) Applicant: CANON KABUSHIKI KAISHA, Tokyo (JP)

(72) Inventors: Yugo Mochizuki, Kanagawa (JP); Kouta Murasawa, Kanagawa (JP); Hiromitsu Yamaguchi, Kanagawa (JP); Hideki Kubo, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 255 days.

(21) Appl. No.: 18/118,799

(22) Filed: Mar. 8, 2023

(65) Prior Publication Data
US 2023/0286288 A1    Sep. 14, 2023

(30) Foreign Application Priority Data

Mar. 9, 2022  (JP) ................................. 2022-036407
Feb. 15, 2023  (JP) ................................. 2023-021872

(51) Int. Cl.
| | |
|---|---|
| *H04N 1/60* | (2006.01) |
| *B41J 2/21* | (2006.01) |
| *H04N 1/405* | (2006.01) |
| *H04N 1/54* | (2006.01) |

(52) U.S. Cl.
CPC .......... *H04N 1/6005* (2013.01); *B41J 2/2107* (2013.01); *B41J 2/2114* (2013.01); *H04N 1/405* (2013.01); *H04N 1/54* (2013.01)

(58) Field of Classification Search
CPC ............................. B41J 2/2107; B41J 2/2114
See application file for complete search history.

(56) References Cited

U.S. PATENT DOCUMENTS

| | | | |
|---|---|---|---|
| 11,613,129 B2 * | 3/2023 | Okamura ............. | C09D 11/102 347/86 |
| 2017/0247560 A1 * | 8/2017 | Watanabe ............... | B41M 5/00 |
| 2019/0292393 A1 * | 9/2019 | Murai .................. | C09D 11/037 |
| 2021/0001656 A1 * | 1/2021 | Wakao ....................... | B41J 2/01 |
| 2021/0146708 A1 * | 5/2021 | Katsuragi ............ | C09D 11/322 |
| 2023/0302839 A1 | 9/2023 | Yamaguchi et al. | |

FOREIGN PATENT DOCUMENTS

JP  2021-008112 A  1/2021

* cited by examiner

*Primary Examiner* — Peter K Huntsinger
(74) *Attorney, Agent, or Firm* — VENABLE LLP

(57) ABSTRACT

A printing apparatus prints an image with a printing unit by applying, onto a printing medium, a first ink containing a fluorescent color material and a second ink containing not fluorescent color material but a resin, determines an amount of the second ink applied to a unit area on the printing medium based on an amount of the first ink applied to the unit area and luminescence information representing a luminescence intensity, and controls an application operation of the first ink and the second ink by the printing unit based on the amount of the first ink and the amount of the second ink applied to the unit area.

25 Claims, 18 Drawing Sheets

FIG. 3
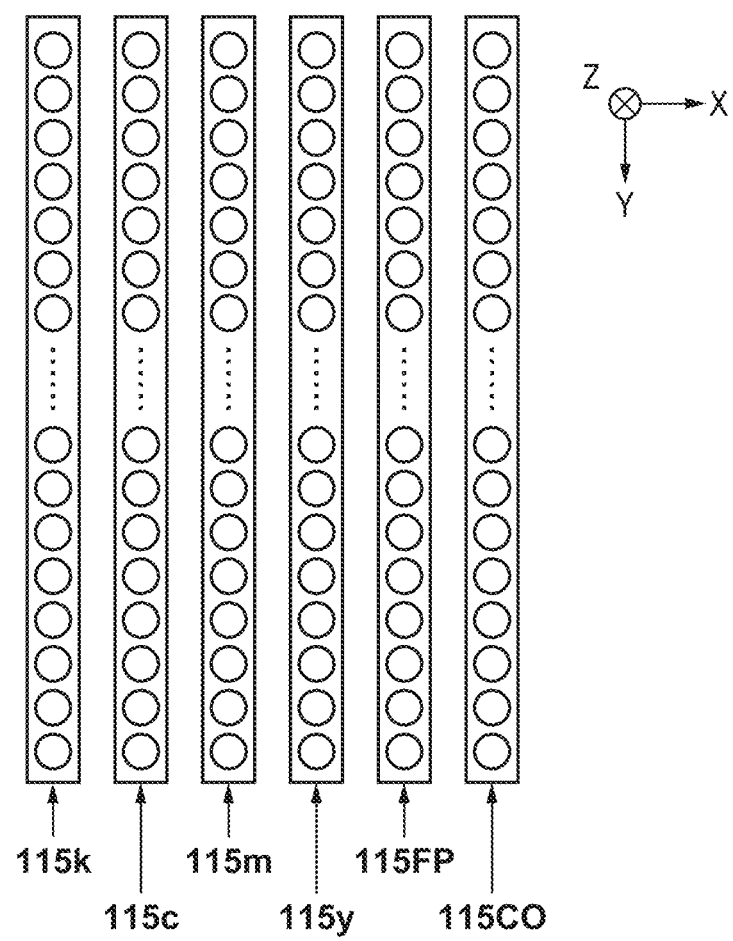
115k  115m  115FP
  115c  115y  115CO
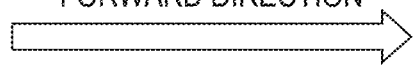
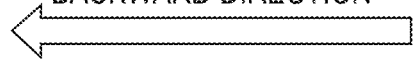

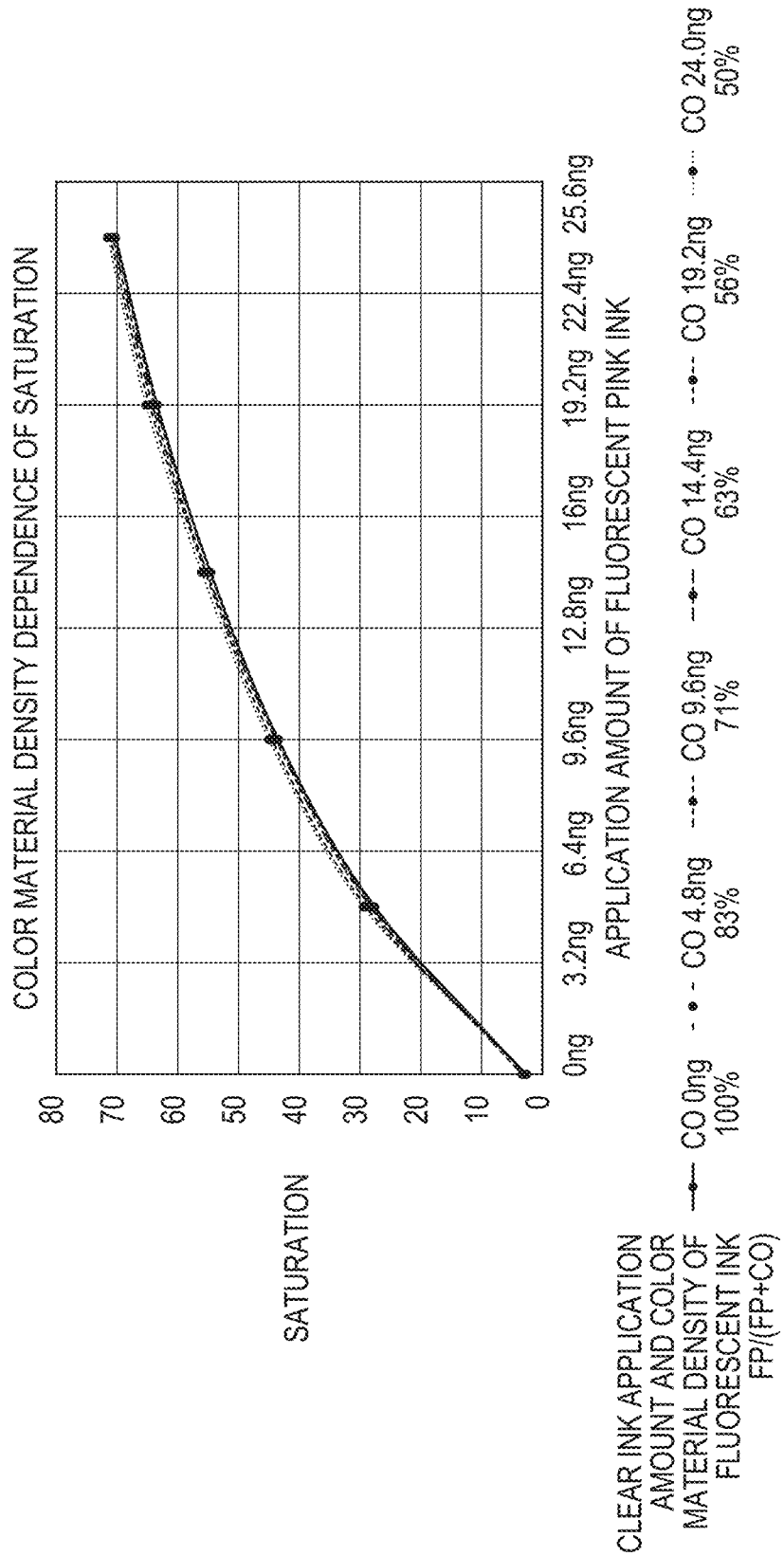

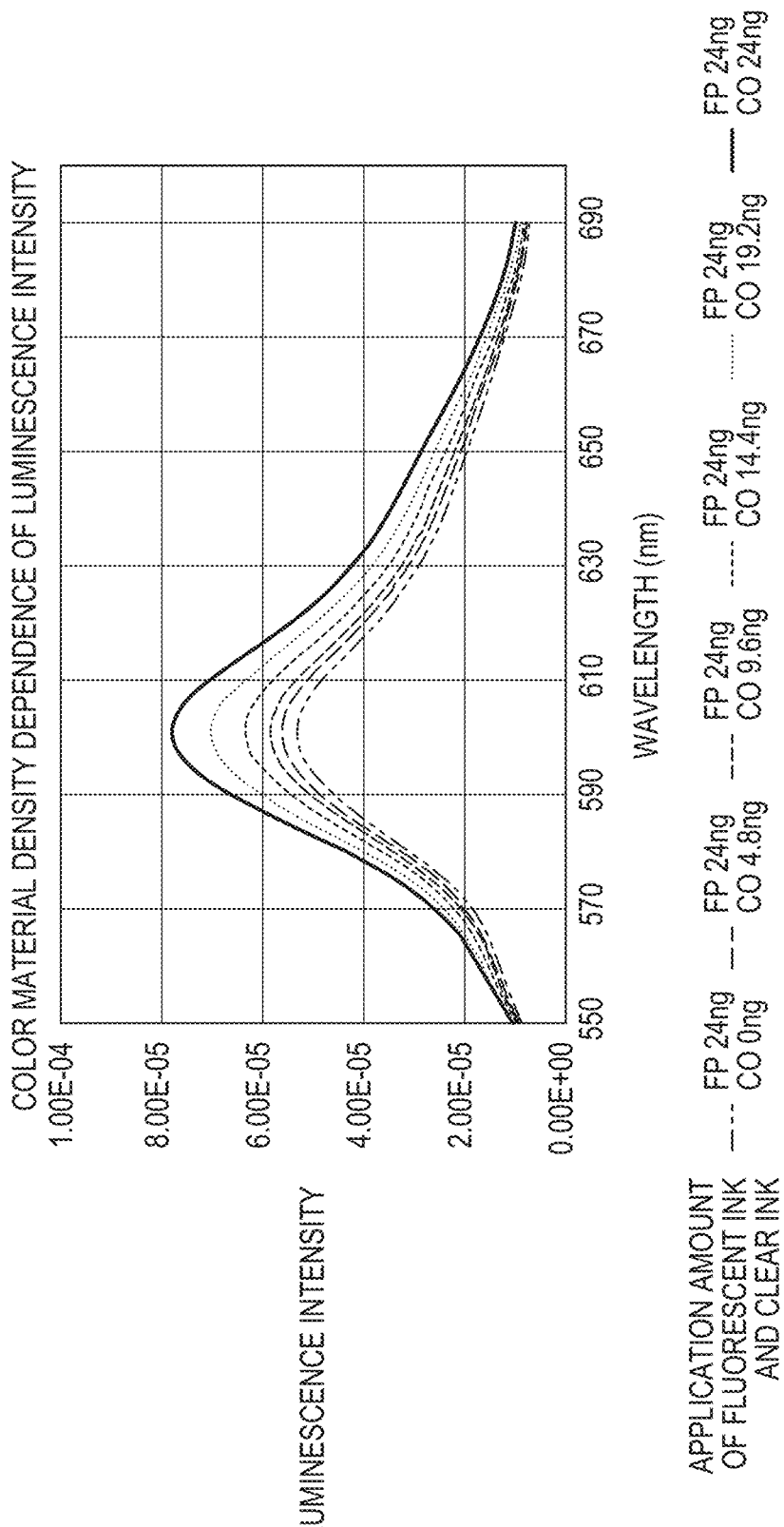

FIG. 6C RELATION BETWEEN LUMINESCENCE INTENSITY (INTEGRAL) AND COLOR MATERIAL AMOUNT/COLOR MATERIAL DENSITY
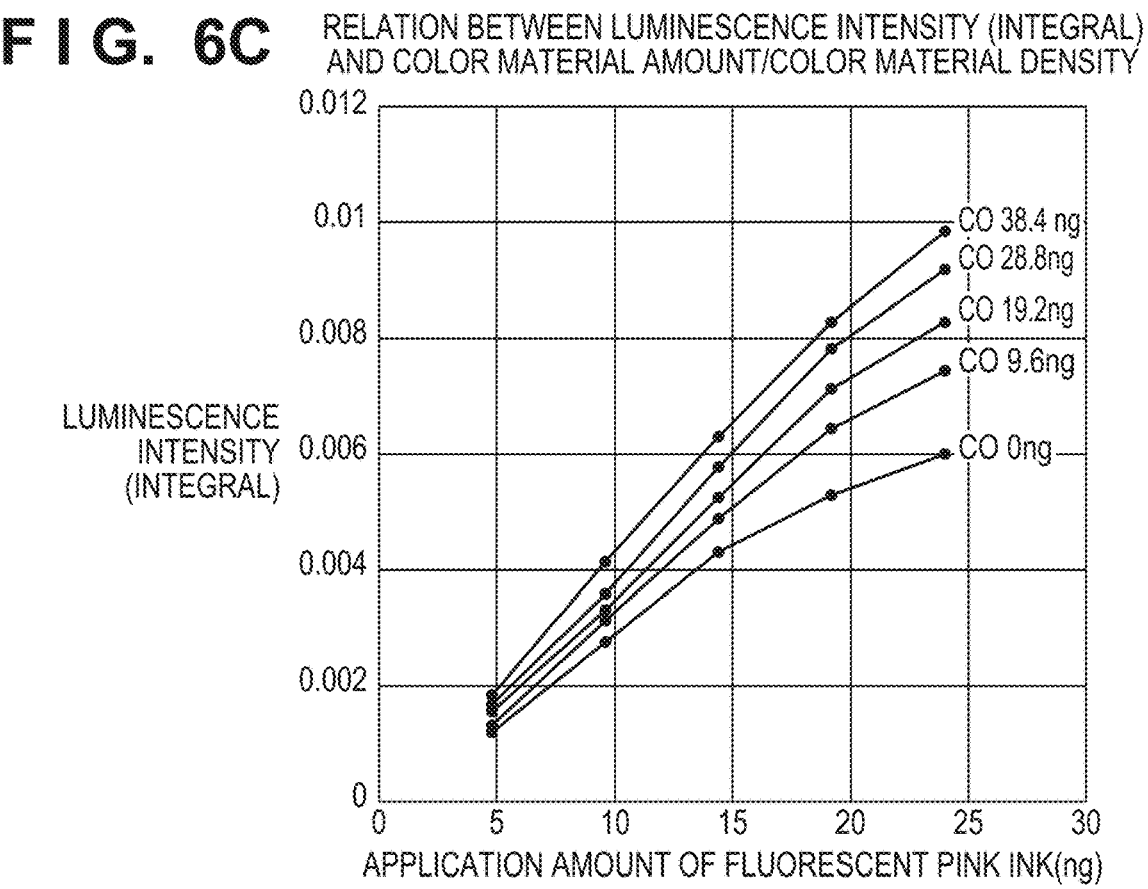
FIG. 6D RELATION BETWEEN LUMINESCENCE INTENSITY (INTEGRAL) AND COLOR MATERIAL AMOUNT/COLOR MATERIAL DENSITY
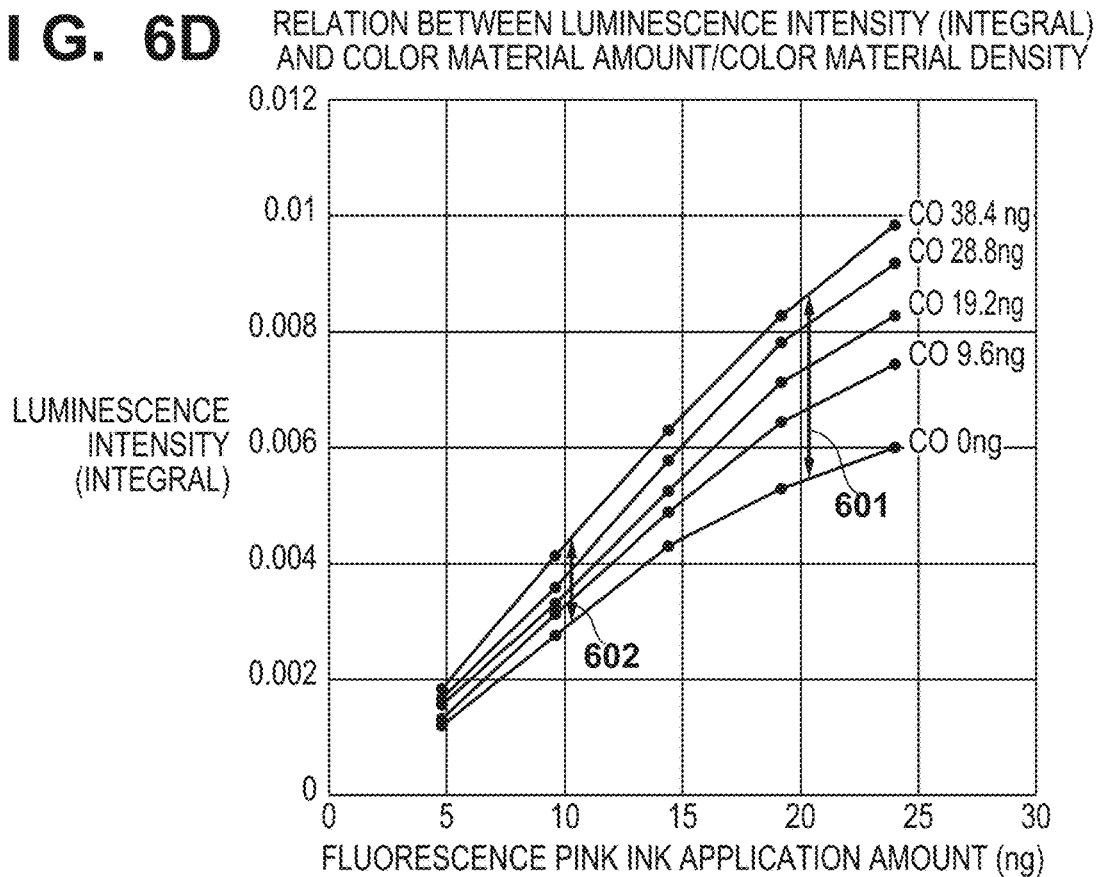

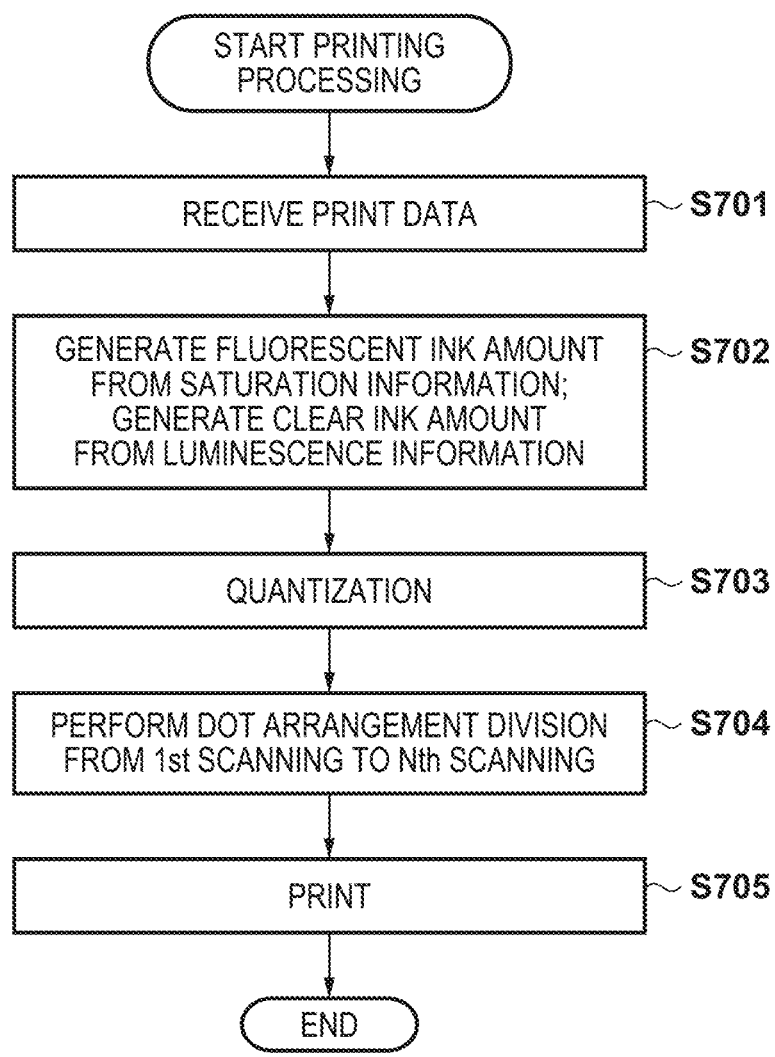

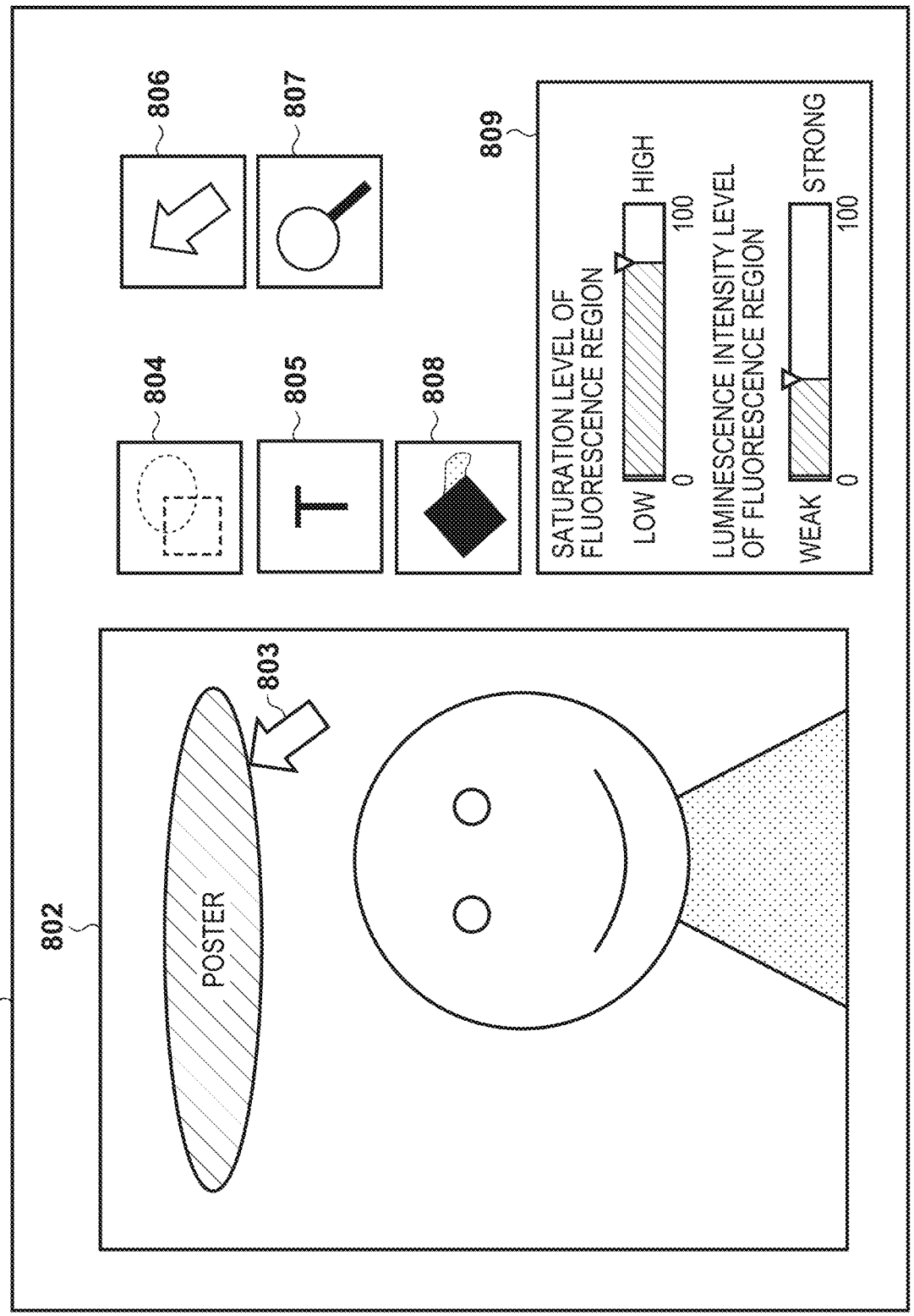

FLUORESCENT INK DOT ARRANGEMENT

CLEAR INK DOT ARRANGEMENT (BEFORE BOLD)

CLEAR INK DOT ARRANGEMENT (AFTER BOLD)

F I G. 15
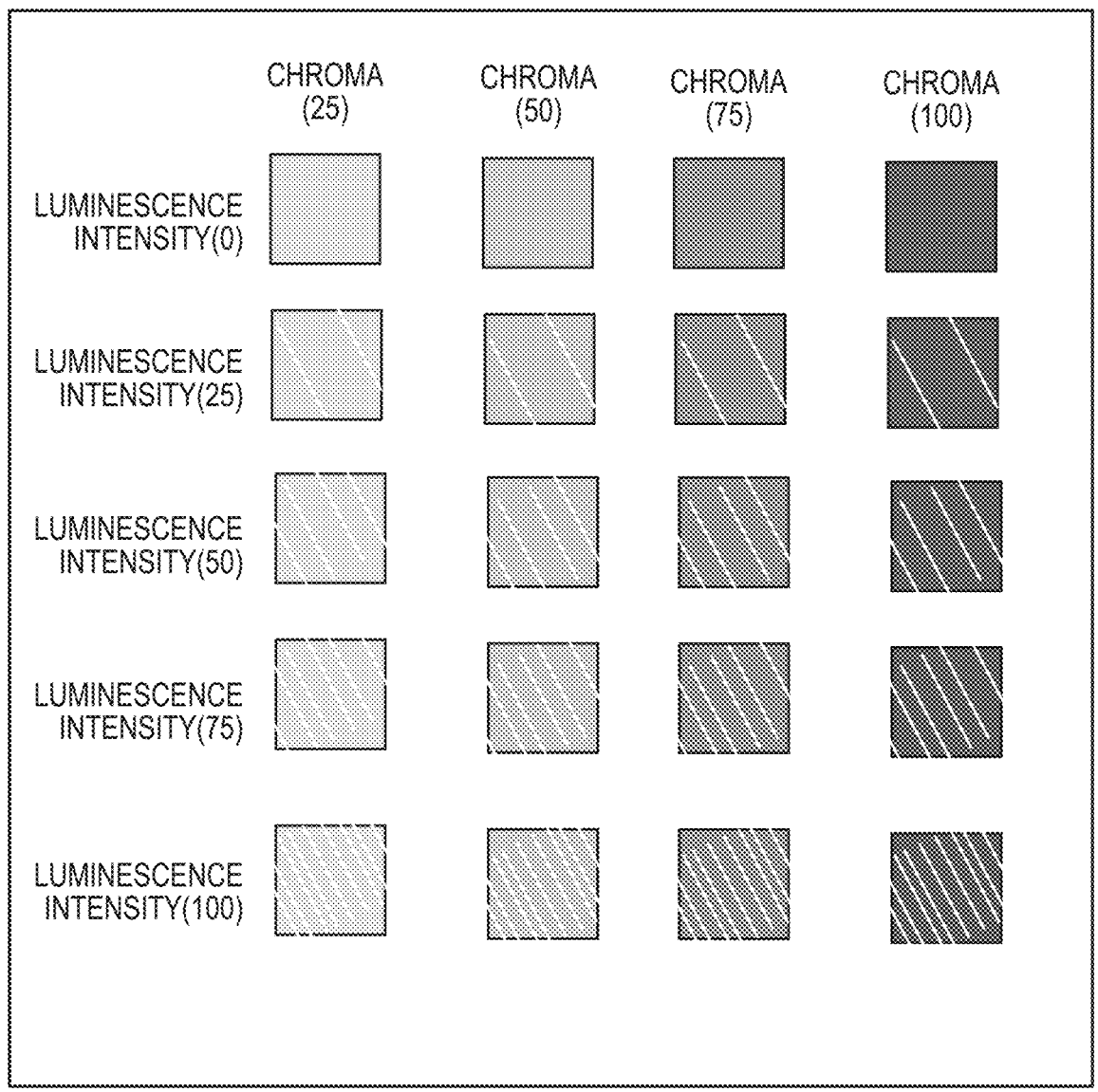

PRINTING SYSTEM USING FLUORESENT AND NON-FLUORESENT INK, PRINTING APPARATUS, IMAGE PROCESSING APPARATUS, IMAGE PROCESSING METHOD, AND CONTROL METHOD THEREOF

BACKGROUND OF THE INVENTION

Field of the Invention

The present invention relates to a printing system, a printing apparatus, an image processing apparatus, an image processing method, and a control method thereof.

Description of the Related Art

There has been conventionally known a printing apparatus that prints an image using an ink of fluorescence (to be also referred to as a fluorescent ink hereinafter) and an ink of non-fluorescence (to be also referred to as a non-fluorescent ink hereinafter) as inks for printing an image on a printing medium. Such a printing apparatus can use the fluorescent ink to print a bright, high-saturation image. A fluorescent, bright, high-saturation image is very conspicuous and is used for a poster, Point Of Purchase advertising (POP) used for sales promotion at a retail store, and the like.

To further catch the eye for this purpose, it is important to print a highly luminescent image. To print a highly luminescent image, for example, Japanese Patent Laid-Open No. 2021-8112 discloses a method of printing an image excellent in luminescence intensity using a fluorescent ink and a clear ink containing no color material. More specifically, Japanese Patent Laid-Open No. 2021-8112 discloses a method of printing an image excellent in luminescence intensity by superimposing a region where the fluorescent ink is applied and a region where the clear ink is applied.

SUMMARY OF THE INVENTION

The present invention provides a technique capable of printing an image by independently controlling the saturation and the luminescence intensity using an ink containing a fluorescent color material.

The present invention in one aspect provides a printing apparatus comprising: a printing unit configured to print an image by applying, onto a printing medium, a first ink containing a fluorescent color material and a second ink containing not fluorescent color material but a resin; a decision unit configured to decide an amount of the second ink applied to a unit area on the printing medium based on an amount of the first ink applied to the unit area and luminescence information representing a luminescence intensity; and a control unit configured to control an application operation of the first ink and the second ink by the printing unit based on the amount of the first ink and the amount of the second ink applied to the unit area.

According to the present invention, an image can be printed by independently controlling the saturation and the luminescence intensity using an ink containing a fluorescent color material.

Further features of the present invention will become apparent from the following description of exemplary embodiments with reference to the attached drawings.

BRIEF DESCRIPTION OF THE DRAWINGS

FIG. 3 is a view showing the arrangement of nozzle arrays when the printhead is viewed from the upper surface (−Z direction) of the printing apparatus;

FIG. 6A is a graph showing the dependence of the saturation on the color material density;

FIG. 6B is a graph for explaining the dependence of the luminescence intensity on the color material density;

FIG. 6C is a graph for explaining the dependence of the luminescence intensity on the color material amount;

FIG. 6D is a graph showing the fluorescent ink application amount and the luminescence intensity control range;

FIG. 7 is a flowchart for explaining printing processing by the printing apparatus according to the first embodiment;

FIG. 8 is a view showing an example of a screen for designating saturation information and luminescence information by the user using a PC in the first embodiment;

FIG. 15 is a view showing a patch image to which saturation information and luminescence intensity information are assigned in the first embodiment;

DESCRIPTION OF THE EMBODIMENTS

Figure 1:
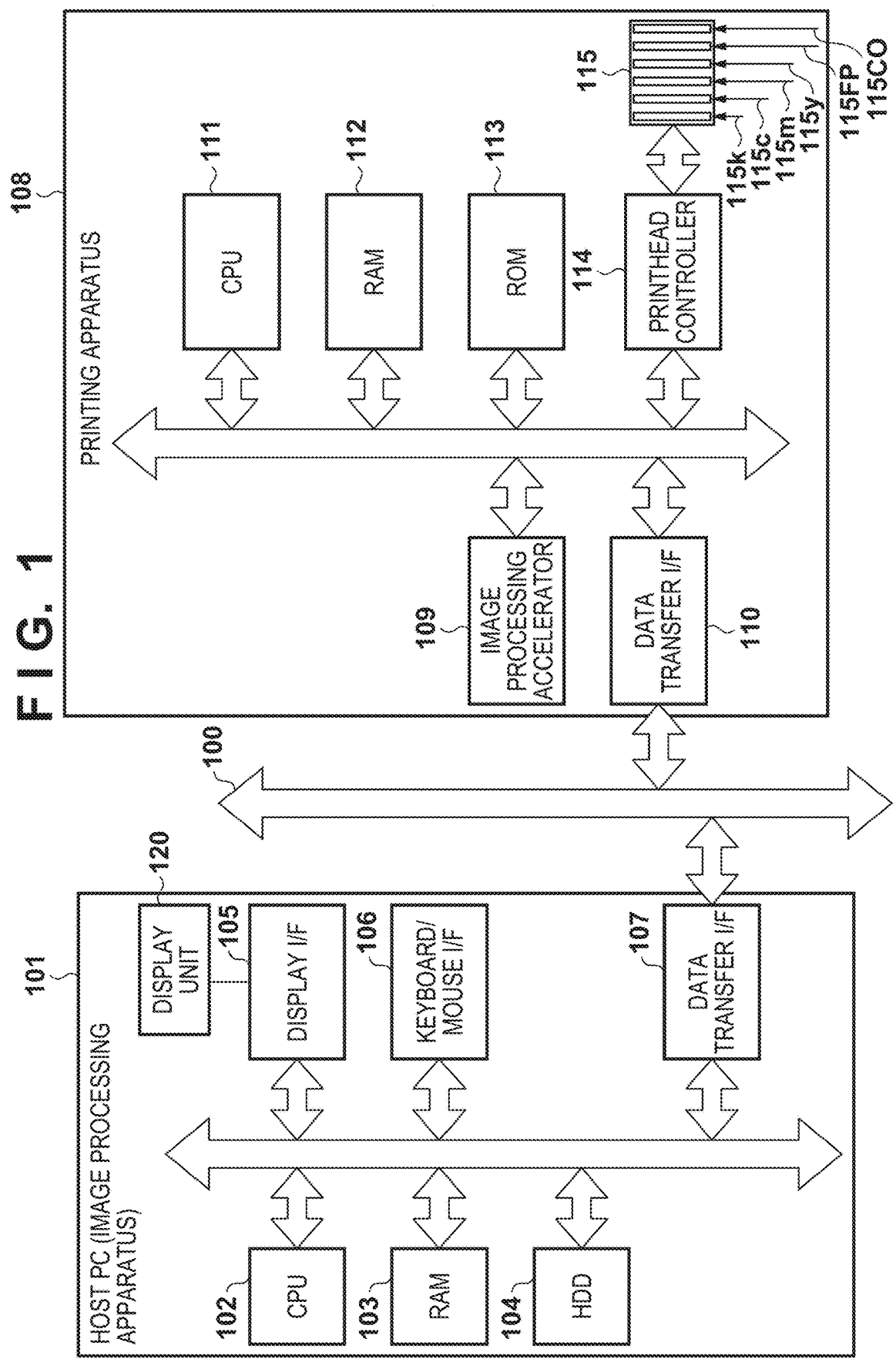
FIG. 1 is a block diagram for explaining the arrangement of a printing system according to the first embodiment of the present invention.

Hereinafter, embodiments will be described in detail with reference to the attached drawings. Note, the following embodiments are not intended to limit the scope of the claimed invention. Multiple features are described in the embodiments, but limitation is not made of an invention that requires all such features, and multiple such features may be combined as appropriate. Furthermore, in the attached drawings, the same reference numerals are given to the same or similar configurations, and redundant description thereof is omitted.

For a single fluorescent ink, the saturation and the luminescence cannot be controlled independently. For example, even if the application amount of fluorescent ink per unit area is increased/decreased to increase/decrease the amount of fluorescent color material on the paper surface, the saturation and the luminescence intensity are increased/decreased simultaneously. If the concentration of fluorescent color material in the fluorescent ink is increased, the absorptivity of an excitation wavelength improves, the saturation increases, but concentration quenching occurs, and the luminescence intensity decreases. If the concentration of fluorescent color material in the fluorescent ink is decreased, concentration quenching relaxes, the luminescence intensity increases, but the absorptivity of the excitation wavelength decreases, and the saturation decreases. That is, the saturation and the luminescence intensity cannot be controlled independently, and no adjustment means can be provided to the user.

According to this disclosure, an image can be printed by independently controlling the saturation and the luminescence intensity using an ink containing a fluorescent color material.

First, terms used in the embodiment will be defined in advance as follows.

"Printing"

In this specification, "printing" not only includes the formation of significant information such as characters and graphics, regardless of whether they are significant or insignificant and whether they are so visualized as to be visually perceivable by humans. "Printing" broadly includes the formation of images, figures, patterns, and the like on a printing medium, or the processing of the medium.

"Printing Medium"

"Printing medium" not only includes paper used in common printing apparatuses, but also broadly includes materials such as cloth, a plastic film, a metal plate, glass, ceramics, wood, and leather, capable of accepting ink.

"Ink"

Ink should be extensively interpreted similar to the definition of "printing" described above. Ink includes a medium which, when applied onto a printing medium, can form images, figures, patterns, and the like, can process the printing medium, and can process ink. The physical property of ink is a liquid. The ink processing is solidification or insolubilization of a coloring agent contained in ink applied to a printing medium.

"Nozzle"

A nozzle represents an orifice, unless otherwise specified. The nozzle incorporates a liquid channel communicating with the orifice, and an element for generating energy used to discharge ink.

"Scanning"

To print on a printing medium, a printhead scans on the printing medium and prints. Head movement for printing or during acceleration/deceleration of the head associated with printing will be described as scanning.

"Reciprocal Printing"

Reciprocal printing represents printing while reciprocating the above-described "printing" or "scanning" on the paper surface. Reciprocal scanning, reciprocal printing, bidirectional scanning, and bidirectional printing also represent similar operations.

"Color Reproduction Range"

A color reproduction range is also called a color gamut or a gamut. In general, the color reproduction range represents a reproducible color range in an arbitrary color space.

An index representing the size of the color reproduction range is a color gamut volume. The color gamut volume is a three-dimensional volume in an arbitrary color space. Chromaticity points constituting the color reproduction range are sometimes discrete. For example, a specific color reproduction range is represented by 729 points in CIE-$L^*a^*b^*$, and points between them are obtained by known interpolation calculation such as tetrahedral interpolation or cubic interpolation. In such a case, a corresponding color gamut volume can be obtained by calculating and cumulating the volume of a tetrahedron, cube, or the like constituting the color reproduction range in CIE-$L^*a^*b^*$ in correspondence with the interpolation calculation method.

Although the color reproduction range or color gamut in the embodiment is not limited to a specific color space, a color reproduction range in the CIE-$L^*a^*b^*$ space will be exemplified in the embodiment. Similarly, the numerical value of the color reproduction range in the embodiment represents a volume when cumulative calculation is performed in the CIE-$L^*a^*b^*$ space on the premise of tetrahedral interpolation.

First Embodiment

FIG. 1 is a block diagram for explaining the arrangement of a printing system according to the first embodiment of the present invention.

A PC 101 serving as an information processing apparatus is, for example, a host PC, a smartphone, or a tablet PC. A CPU 102 of the PC 101 executes various processes by deploying a program stored in a HDD 104 to a RAM 103 serving as a work area and executing it. For example, the CPU 102 receives a command from the user via a Human Interface Device (HID) I/F 106 or a touch panel (not shown). The CPU 102 generates print data printable by a printing apparatus 108 in accordance with the received command or a program stored in the HDD 104, and transfers it to the printing apparatus 108 via a data transfer I/F 107 and a communication line 100. The CPU 102 executes, in accordance with a program stored in the HDD 104, predetermined processing on the print data received from the printing apparatus 108 via the data transfer I/F 107 and the communication line 100, and displays the result and various kinds of information on a display unit 120 via a display I/F 105.

Next, the arrangement of the printing apparatus 108 will be explained.

A CPU 111 performs overall control of the printing apparatus 108 by deploying a program stored in a ROM 113 to a RAM 112 serving as a work area and executing it. An image processing accelerator 109 is hardware capable of executing image processing at higher speed than by the CPU 111. The CPU 111 writes parameters and data necessary for image processing at a predetermined address in the RAM 112, activating the image processing accelerator 109. After loading the parameters and data, the image processing accelerator 109 executes image processing on the data. However, the image processing accelerator 109 is not an indispensable element, and the CPU 111 may execute equivalent processing. The parameters may be stored in the ROM 113 or a storage (not shown) such as a flash memory or a HDD. A data transfer I/F 110 communicates with the PC 101 via the communication line 100. A printhead controller 114 controls a printhead 115.

Next, image processing that is performed by the CPU 111 or the image processing accelerator 109 will be explained.

The image processing is, for example, processing of generating, based on received print data, data representing an ink dot formation position in each scanning by the printhead 115. The CPU 111 or the image processing accelerator 109 performs color conversion processing and quantization processing of received print data.

The color conversion processing is processing of performing color separation into an ink concentration treated by the printing apparatus 108. For example, received print data includes image data representing an image and fluorescence data for performing fluorescent printing. When the image data is data representing an image at color space coordinates such as sRGB serving as expression colors of a monitor, the data representing an image at the color coordinates (R, G, B) of sRGB is converted into non-fluorescent ink data (CMYK) treated by the printing apparatus 108. Alternatively, the data representing an image is converted into ink data (CMYKFP) including a fluorescent ink color. The fluorescence data is converted into fluorescent ink data. Further, when there are both data representing an image at the color coordinates (R, G, B) of sRGB and fluorescence data, they are converted into both non-fluorescent ink data (CMYK) and fluorescent ink data (fluorescence pink (FP)). Alternatively, these data are converted into ink data (CMYKFP) including a fluorescent ink color and fluorescent ink data (FP). In this case, the fluorescent ink data are generated for two planes. A color conversion method is implemented by matrix calculation processing, processing using a three-dimensional lookup table (LUT) or a four-dimensional LUT, or the like. Clear ink data (CO) is also generated here. Details of this will be described later.

The printing apparatus 108 according to the first embodiment uses, for example, inks of black (K), cyan (C), magenta (M), yellow (Y), and fluorescent pink (FP), and clear ink (CO). Thus, image data and fluorescence data of R, G, and B signals are converted into image data formed from color signals of 8 bits for each of K, C, M, Y, and FP. The color signal of each color corresponds to the application amount of each ink. The ink colors are five, K, C, M, Y, and FP colors in this example, but other ink colors such as low-concentration light cyan (Lc), light magenta (Lm), and gray (Gy) inks may also be used for higher image quality. In this case, ink signals corresponding to these colors are generated. In the first embodiment, light cyan (Lc), light magenta (Lm), and gray (Gy) inks will also be described as non-fluorescent inks. Further, achromatic inks such as black (K) and gray (Gy) inks will also be described as non-fluorescent inks.

After color conversion processing, quantization processing is performed on ink data. The quantization processing is processing of decreasing the number of tone levels of ink data. In the first embodiment, quantization is performed using a dither matrix in which thresholds for comparison with an ink data value for each pixel are arrayed. After the quantization processing, binary data representing whether to form a dot at each dot formation position is finally generated.

After the image processing is performed in this manner, the printhead controller 114 transfers binary data to the printhead 115. At the same time, the CPU 111 performs printing control to operate, via the printhead controller 114, a carriage motor that operates the printhead 115, and further operate a conveyance motor that conveys a printing medium (sheet). Simultaneously when the printhead 115 scans on a printing medium, it discharges an ink droplet onto the printing medium, forming an image.

When performing printing by multi-scanning, predetermined image processing is performed and then scanning order decision processing is performed. The scanning order decision processing is processing of thinning an image using a mask pattern or the like for data after quantization processing in order to generate data corresponding to each scanning. At this time, the processing may be speeded up using the image processing accelerator 109.

The PC 101 and the printing apparatus 108 are connected via the communication line 100. Although a local area network will be exemplified as an example of the communication line 100 in the first embodiment, a USB hub, a wireless communication network using a wireless access point, a connection using a Wifi direct communication function, or the like is also available.

In the following description, the printhead 115 has a total of six printing nozzle arrays for four color inks of cyan (C), magenta (M), yellow (Y), and black (K), a fluorescent ink of fluorescence pink (FP), and a clear ink (CO) containing no color material. Note that the fluorescent ink is not limited to fluorescence pink and may be fluorescence red (FR), fluorescence yellow (FY), fluorescence green (FG), fluorescence blue (FB), or some of them.

Figure 2:
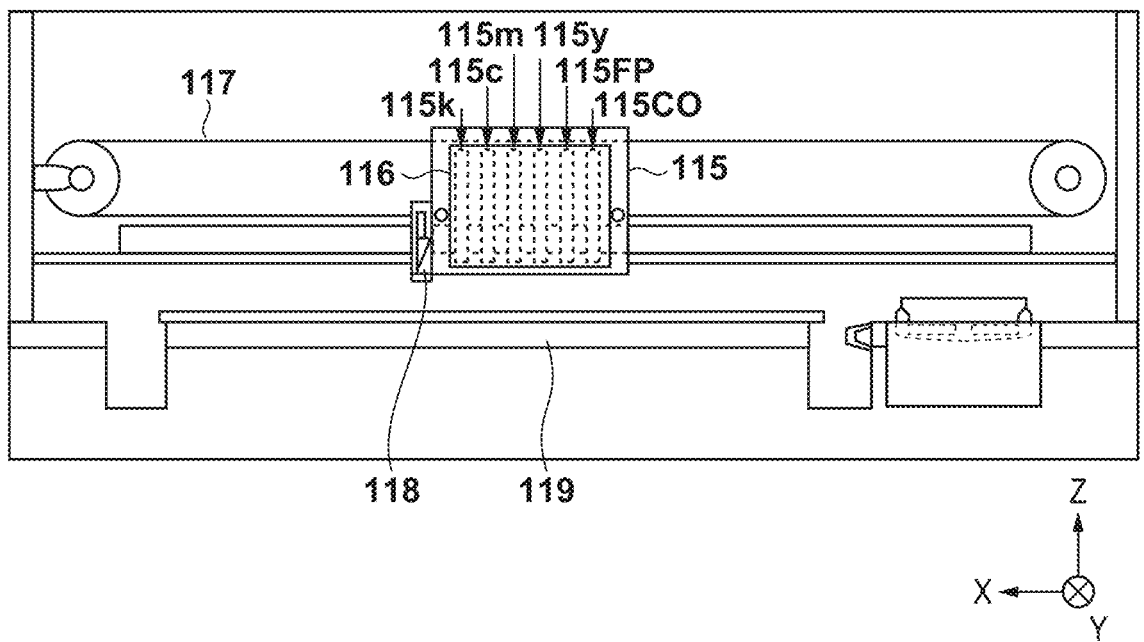
FIG. 2 is a view for explaining scanning of a printhead and a printing medium conveyance operation according to the first embodiment.

FIG. 2 is a view for explaining scanning of the printhead 115 and a printing medium conveyance operation according to the first embodiment.

In the first embodiment, an image is printed by N (natural number of N 2) scans with respect to a unit region of one nozzle array. The printhead 115 includes a carriage 116, nozzle arrays 115$k$, 115$c$, 115$m$, 115$y$, and 115FP, and an optical sensor 118. The carriage 116 bearing the five nozzle arrays 115$k$, 115$c$, 115$m$, 115$y$, and 115FP and the optical sensor 118 can reciprocate in the X direction (main scanning direction) in FIG. 2 by the driving force of the carriage motor that is transferred via a belt 117. While the carriage 116 moves in the X direction relatively to a printing medium, each nozzle of the nozzle array discharges an ink droplet in the direction of gravity (−Z direction in FIG. 2) based on print data. As a result, an image is printed by 1/N of main scanning on the printing medium placed on a platen 119. Upon completion of one main scanning, the printing medium is conveyed in the conveyance direction (−Y direction in FIG. 2) perpendicular to the main scanning direction by only a distance corresponding to the width of 1/N main scanning. By these operations, an image of a width corresponding to one nozzle array is printed by N scans. The main scanning and conveyance operation are alternately repeated, gradually forming an image on the printing medium.

Figure 5:
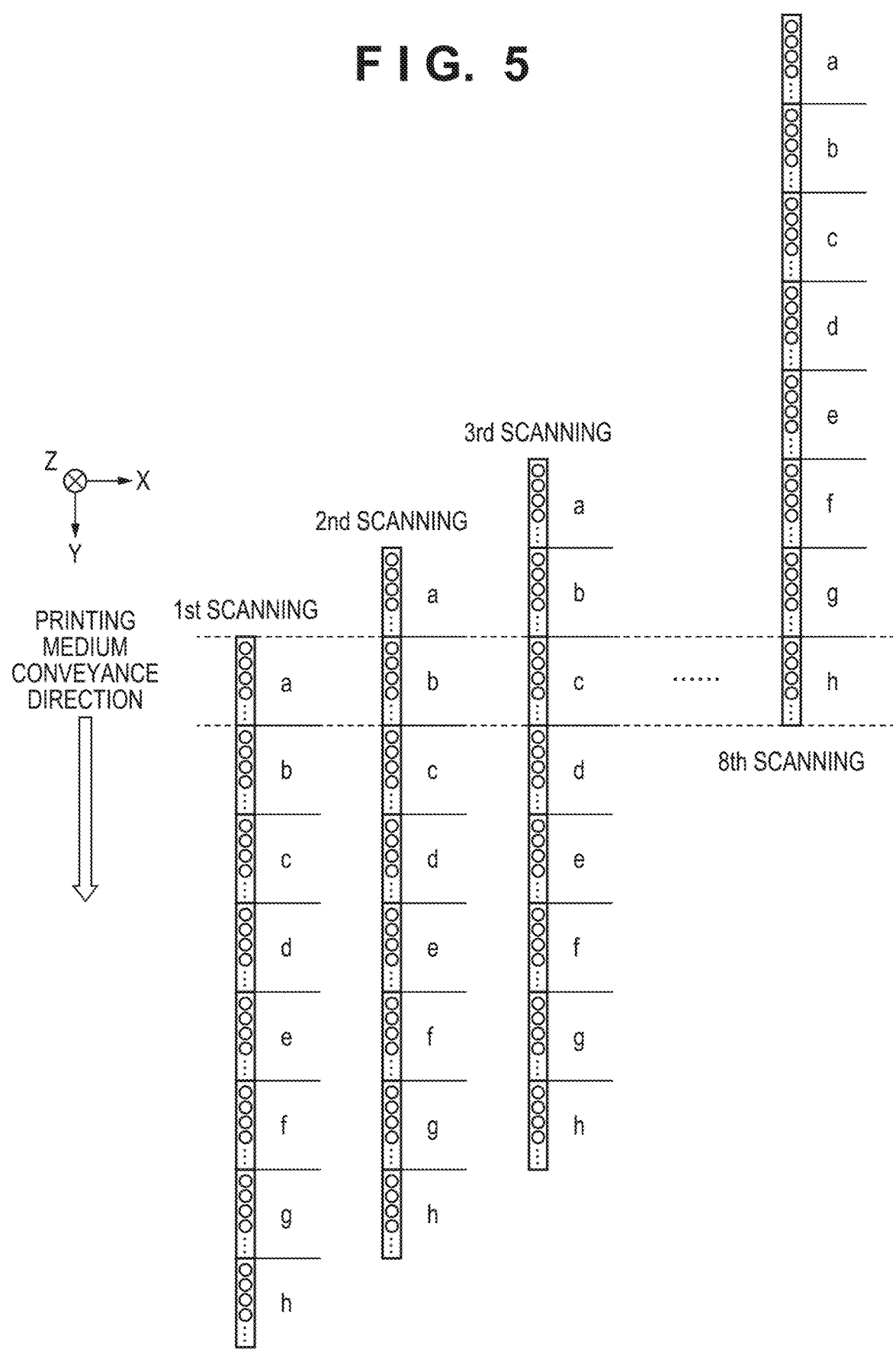
FIG. 5 is a view for explaining each scanning corresponding to the positions of the nozzles of the printhead.

FIG. 5 is a view for explaining each scanning corresponding to the positions of the nozzles of the printhead 115. FIG. 5 shows a case for N=8.

Regions a, b, c, d, e, f, and g run from the upstream in the conveyance direction (Y direction) of a printing medium, and image printing in a region by one nozzle array is performed finally by scanning of a region h. The printing resolution in the X direction is determined by the discharge frequency and the moving speed of the carriage. The printing resolution in the Y direction is determined by the nozzle resolution (to be described later) of the printhead 115. In the first embodiment, for example, both of the printing resolutions are 600 [dpi]. Hence, discharged ink dots are printed at resolutions of 600 [dpi] in the vertical and horizontal directions. While moving together with the carriage 116, the optical sensor 118 performs a detection operation and determines whether a printing medium exists on the platen 119.

FIG. 3 is a view showing the arrangement of the nozzle arrays when the printhead 115 is viewed from the upper surface (−Z direction) of the printing apparatus 108.

In the printhead 115, the five nozzle arrays are arranged at different positions in the X direction. That is, the nozzle array 115c corresponding to the C ink, the nozzle array 115m corresponding to the M ink, and the nozzle array 115y corresponding to the Y ink are arranged. Further, the nozzle array 115k corresponding to the K (black) ink, the nozzle array 115FP corresponding to the FP ink, and a nozzle array 115CO corresponding to the CO ink are arranged. The nozzles of the nozzle array 115c discharge ink droplets of the C ink, those of the nozzle array 115m discharge ink droplets of the M ink, those of the nozzle array 115y discharge ink droplets of the Y ink, and those of the nozzle array 115k discharge ink droplets of the K ink. Further, the nozzle array 115FP discharges ink droplets of the FP ink, and the nozzle array 115CO discharges ink droplets of the CO ink. In each nozzle array, a plurality of nozzles for discharging an ink droplet are arrayed at a predetermined pitch in the Y direction. The predetermined pitch is called a nozzle resolution.

A printing medium in the first embodiment has a substrate and at least one ink receiving layer. In the first embodiment, for example, a printing medium for printing by an inkjet printing method is used. In the first embodiment, for example, glossy paper is used as the printing medium and a pigment ink containing a pigment is used as the color material.

<Characteristics of Fluorescent Ink and Subtractive Color Mixing Ink>

A fluorescent color material is a color material that absorbs light of an excitation wavelength, changes from the ground state to the excitation state, is luminescent at a luminescence wavelength, and returns to the ground state, thereby developing color.

Figure 4:
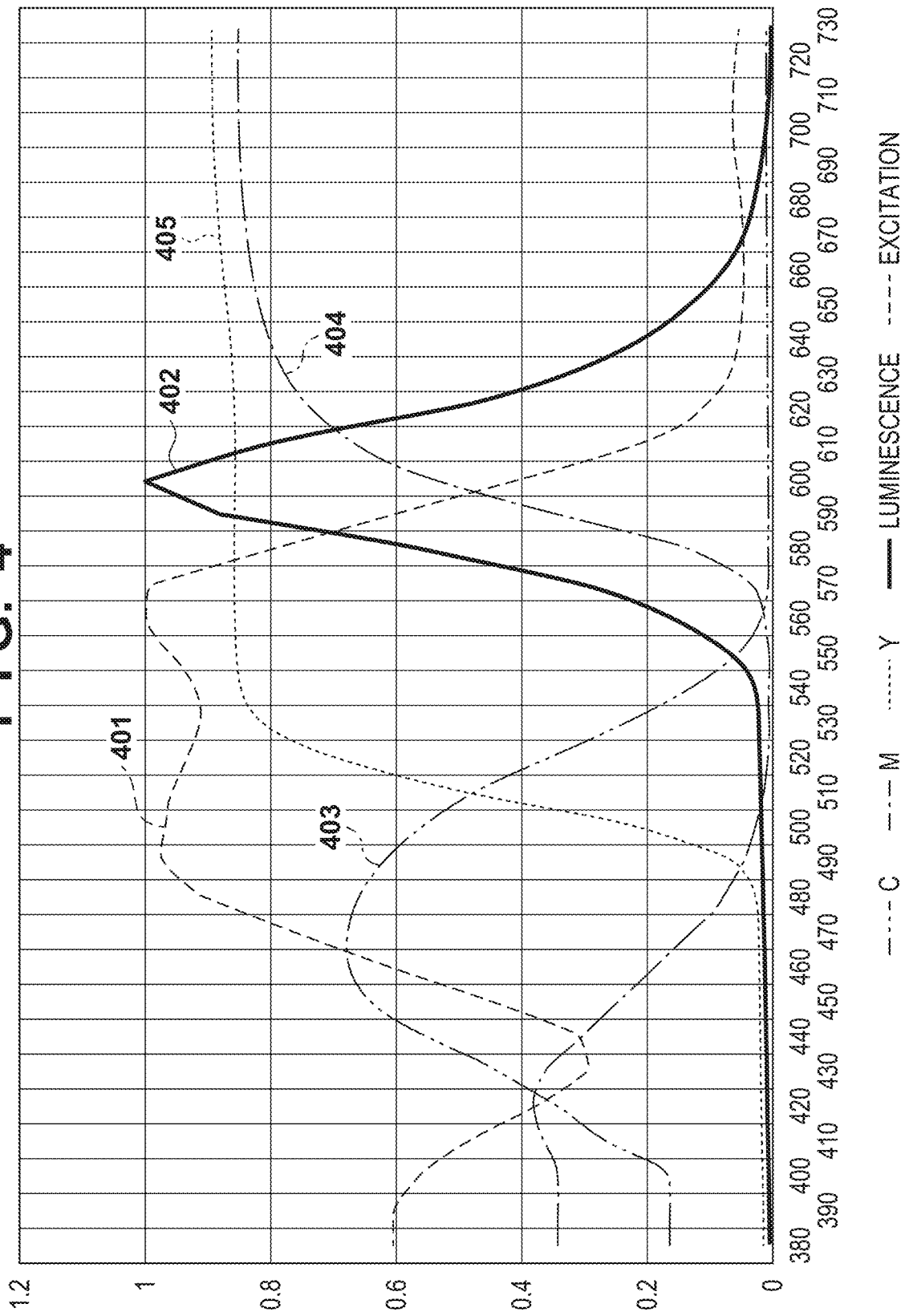
FIG. 4 is a graph showing the intensity of an excitation wavelength and that of a luminescence wavelength when a fluorescence pink (FP) ink is applied onto a printing medium.

FIG. 4 is a graph showing the intensity of an excitation wavelength 401 and that of a luminescence wavelength 402 when the fluorescence pink (FP) ink is applied onto a printing medium. In FIG. 4, the abscissa represents the wavelength of light and the ordinate represents the intensity.

This graph represents the intensity of each light when the wavelength of light irradiating a printing sample and that of light received from the sample are respectively changed and detected. The luminescence wavelength 402 represents the intensity of light received from a printing sample for each wavelength when the printing sample is irradiated with light of the excitation wavelength. FIG. 4 shows a state in which the printing sample is irradiated with 480-nm light. The excitation wavelength 401 represents the intensity of light received when the wavelength of received light is fixed and the wavelength of light irradiating a printing sample is changed. FIG. 4 shows a state in which the wavelength of received light is fixed at 600 nm. As shown in FIG. 4, the excitation wavelength band of the fluorescent ink applied onto the printing medium overlaps the luminescence wavelength band and is on the short wavelength side. The excitation wavelength 401 increases/decreases for each wavelength, and includes a wavelength at which the fluorescent ink is efficiently luminescent and a wavelength at which it is not efficiently luminescent. Since the fluorescent color material is luminescent, the reflectance at the luminescence wavelength often exceeds 1. In the embodiment, a color material having the above-described characteristics will be called a fluorescent color material.

Although excitation and luminescence of the fluorescence pink ink have been described above, a fluorescent ink luminescent at another wavelength may be used in the embodiment. For example, a fluorescence blue ink luminescent in the blue region (450 nm to 500 nm) may be used, or a fluorescence green ink luminescent in the green region (500 nm to 565 nm) may be used. Further, a fluorescence yellow ink luminescent in the yellow region (565 nm to 590 nm) may be used, or a fluorescence orange ink or fluorescence red ink luminescent in the red region (590 nm to 780 nm) may be used. A combination of the above-mentioned fluorescent inks may be used. For example, a fluorescence yellow ink luminescent in a region as a combination of the yellow and red regions may be used. Furthermore, fluorescent inks different in the intensity of the excitation wavelength may be combined to adjust the color tone. For example, fluorescence pink luminescent in the orange region for which the excitation in the blue region is weak and that in the green region is strong may be used.

In the embodiment, of the C, M, Y, K, and CO inks serving as non-fluorescent inks, inks of four C, M, Y, and K colors will be called subtractive color mixing inks. That is, an ink that absorbs light of a specific wavelength out of irradiated light and is not luminescent will be called a subtractive color mixing ink. For example, the subtractive color mixing ink has a spectral reflectance as represented by a spectral reflectance 403 of the cyan ink, a spectral reflectance 404 of the magenta ink, and a spectral reflectance 405 of the yellow ink in FIG. 4. Note that the graph in FIG. 4 represents the result of measurement using a method of measuring a spectral reflectance. Unlike the fluorescent ink, the subtractive color mixing ink only absorbs light and its reflectance does not exceed 1.

Next, mixing of the fluorescent ink and the subtractive color mixing ink on a printing medium will be explained with reference to FIG. 4. When the fluorescence pink ink and the yellow ink are mixed, the yellow ink absorbs light in the wavelength band of the excitation wavelength 401 of the fluorescence pink ink. Since the excited light is absorbed by the yellow ink, the fluorescence pink ink is not sufficiently excited and the luminescence is suppressed.

When the fluorescence pink ink and the cyan ink of the spectral reflectance 403 are mixed, the cyan ink absorbs light of the wavelength band of the luminescence wavelength 402 of the fluorescence pink ink. Luminescent light of the fluorescence pink ink is absorbed by the cyan ink, and the luminescence is suppressed. When the fluorescence pink ink and the magenta ink of the spectral reflectance 404 are mixed, the magenta ink absorbs light of a wavelength band in which the excitation sensitivity of the fluorescence pink ink is high. The fluorescence pink ink is not satisfactorily excited, and the luminescence is suppressed. In addition, luminescent light of the fluorescence pink ink is absorbed by the magenta ink, and the luminescence is suppressed. When the fluorescence pink ink and the black ink (not shown) are mixed, the black ink absorbs light of the wavelength band of the luminescence wavelength 401 of the fluorescence pink ink, and also absorbs light of the wavelength band of the luminescence wavelength 402. The fluorescence pink ink is not satisfactorily excited, and the luminescence is also suppressed.

That is, when the fluorescence pink ink and a subtractive color mixing ink are mixed, the contribution of the fluorescence pink ink to color development decreases. This characteristic is greatly influenced by the positional relationship between the fluorescent ink and the subtractive color mixing ink on a printing medium. In a case in which the ink layer of the fluorescent ink exists below that of the subtractive color mixing ink, the characteristic is more greatly influenced by the subtractive color mixing ink, compared to a case in which the ink layer of the fluorescent ink exists above that of the subtractive color mixing ink. As a result, the contribution of the fluorescence pink ink to color development becomes lower in the case in which the fluorescent ink exists below the subtractive color mixing ink, compared to the case in which the fluorescent ink exists above the subtractive color mixing ink.

Next, a fluorescent ink used in the first embodiment will be described. The first embodiment adopts a fluorescent ink prepared by mixing the dispersing element of a color material having fluorescence characteristics, a solvent, and an activator. The dispersing element of a fluorescent color material used in the first embodiment is the dispersing element of a color material having the above-described fluorescence characteristics. Examples are NKW-3207E (fluorescence pink water dispersing element: Japan Fluorescent Chemistry) and NKW-3205E (fluorescence yellow water dispersing element: Japan Fluorescent Chemistry), but any dispersing element of a color material having fluorescence characteristics is available.

The above-described fluorescent color material dispersing element is combined with a known solvent and activator and dispersed, obtaining an ink. The dispersion method of the fluorescent color material dispersing element is not particularly limited. For example, a fluorescent color material dispersing element dispersed by a surfactant, a resin dispersion fluorescent color material dispersing element dispersed by a dispersion resin, or the like is available. Needless to say, a combination of fluorescent color material dispersing elements of different dispersion methods can also be used. The surfactant can be an anionic, nonionic, cationic, or double ionic activator. The dispersion resin is arbitrary as far as the resin is water-soluble or water-dispersible. Of such dispersion resins, a dispersion resin having a weight-average molecular weight of 1,000 (inclusive) to 100,000 (inclusive), or further 3,000 (inclusive) to 50,000 (inclusive) is preferable. The solvent preferably uses, for example, an aqueous medium containing water and a water-soluble organic solvent.

One cause of a decrease in the luminescence intensity of an image is concentration quenching. The concentration quenching is a phenomenon in which increasing the concentration of a fluorescent color material decreases the luminescence intensity of a printed image. In general, excitation energy absorbed by a fluorescent color material moves and is consumed through the fluorescent color material owing to the intermolecular interaction of the fluorescent color material, causing concentration quenching. As the intermolecular distance of the fluorescent color material is larger, concentration quenching less occurs less. When a fluorescent ink containing a fluorescent dye is applied to a printing medium, the fluorescent dye associates and aggregates on the printing medium along with penetration of the liquid component into the printing medium. As the fluorescent dye aggregates, the intermolecular distance of the fluorescent dye becomes short. It is considered that concentration quenching readily occurs and the luminescence intensity of an image decreases.

Next, a clear ink used in the embodiment will be explained. Note that the clear ink is an ink containing no color material but a resin. The resin can be a water-soluble resin soluble in an aqueous medium or a water-dispersible resin (water-insoluble resin) that can exist in a state in which it is dispersed as particles in an aqueous medium.

When a resin particle is used as a resin contained in a clear ink, it enters the interval between fluorescent color material particles and can widen the distance between adjacent fluorescent color material particles. This can suppress the above-mentioned concentration quenching and increase the luminescence intensity of an image.

FIG. 6A is a graph showing the dependence of the saturation on the color material density.

This graph is based on the result of measuring, by a spectrophotometric color measurement device, the colors of a plurality of patches that are printed on glossy paper while changing a combination of the fluorescent ink application amount and the clear ink application amount. Here, the saturation is calculated from $L^*a^*b^*$ of the color measurement result as a distance from the origin on the a-b plane. This graph shows an increase in the saturation along the ordinate when the fluorescent ink application amount is increased along the abscissa for each clear ink application amount. The experimental result reveals that when the clear ink application amount is increased, that is, the density of the fluorescence pink color material is decreased, a change of the saturation is small. In other words, the dependence of the saturation on the color material density is small and the saturation is substantially determined by only the total color material amount.

FIG. 6B is a graph showing the dependence of the luminescence intensity on the color material density.

This graph is based on the result of performing spectrometry of the luminescence intensity when the fluorescent ink application amount is fixed and the clear ink application amount is changed. The experimental result shows that even if the color material amount is constant, the luminescence intensity is increased by applying the clear ink so that the resin enters the interval between color material particles to decrease the color material density.

FIG. 6C is a graph showing the dependence of the luminescence intensity on the color material amount and the color material density. This graph shows the result of performing spectrometry of the luminescence intensity when both the fluorescent ink application amount and the clear ink application amount are changed. The ordinate represents a value obtained by integrating the luminescence intensity after spectrometry from 550 nm to 700 nm. The result reveals that as the amount of color material applied onto a printing medium is larger, the luminescence intensity becomes higher and the degree of increase in luminescence intensity by application of the clear ink becomes larger. This means that as the color material amount is larger, a decrease in luminescence intensity by concentration quenching is larger and the concentration quenching suppression effect by application of the clear ink is larger. The result is a result of obtaining the dependence of the fluorescent ink application amount, and this also applies to the color material concentration of the fluorescent ink. That is, as the color material concentration of the fluorescent ink is higher, the luminescence intensity is higher, but a decrease in luminescence intensity by concentration quenching is also larger and the concentration quenching suppression effect by application of the clear ink is also larger.

<Multicolor of Fluorescent Ink and Subtractive Color Mixing Ink>

As for a color (to be also referred to as "multicolor" hereinafter) constituted by a plurality of colors of subtractive color mixing inks, even if the absorption wavelengths of the respective colors interfere with each other, the absorptance of light at the absorption wavelengths only improves without inhibiting absorption of another color. However, as for the multicolor of the fluorescent ink and subtractive color mixing ink, the luminescence of the fluorescent ink is suppressed, as described above. The contribution of the fluorescent ink to color development greatly decreases, causing a color change steeper than a color change of the multicolor of subtractive color mixing inks. This results in an image error of a pseudo-outline.

FIG. 7 is a flowchart for explaining printing processing by the printing apparatus 108 according to the first embodiment. In the first embodiment, the saturation by fluorescent color development and the luminescence intensity by fluorescent luminescence can be independently controlled by the processing shown in the flowchart of FIG. 7. In the embodiment, an image region used will be called a fluorescence use region. The processing shown in the flowchart of FIG. 7 is implemented by, for example, deploying a program stored in the ROM 113 into the RAM 112 and executing it by the CPU 111. Note that the processing shown in the flowchart of FIG. 7 may be executed by, for example, the image processing accelerator 109.

In step S701, the CPU 111 receives print data transmitted from the PC 101. The print data includes saturation information of the fluorescence use region as color information. Also, the print data includes luminescence intensity data of the fluorescence use region as luminescence information.

FIG. 8 is a view showing an example of a screen for designating saturation information and luminescence information by the user using the PC 101 in the first embodiment. This screen is displayed on the display unit 120 connected via the display I/F 105.

The user can designate the saturation of a portion to be printed with fluorescence and the luminescence intensity using slider bars in an area 809 via the screen. A screen 801 is the screen of an application for editing a fluorescence use region. The user can designate a position on an image by operating a pointing device on an image 802 to be edited and moving a cursor 803. A button 804 is used to select/create a rectangular region by the user. A button 805 is a text edit button for superimposing text data on image data at the time of editing. The text edit button 805 can be used to, for example, add a text "POSTER" on the image 802 and change the contents of the text. A button 806 is a change button for changing the cursor 803 to another pointer. The change button 806 can change, for example, the cursor 803 to a rectangular frame for designating the entire balloon region. A button 807 is a scaling button for scaling display information of the image 802. A button 808 is a color change button for changing saturation information and luminescence information of a selected fluorescence use region. When the color change button 808 is touched, a saturation level change slide bar and a luminescence intensity level change slide bar displayed in the area 809 are enabled and the positions of the bars become changeable. A saturation level and luminescence intensity level designated within a range of 0 to 100 are transmitted from the PC 101 as the above-described saturation information and luminescence information.

The process then advances to step S702, and the CPU 111 generates data representing a fluorescent ink amount from saturation information of the fluorescence use region included in the color information of the print data received in step S701, and generates data representing a clear ink amount from the luminescence information. In the first embodiment, these data are generated using one-dimensional lookup table (1D-LUT) processing.

Figure 9B:
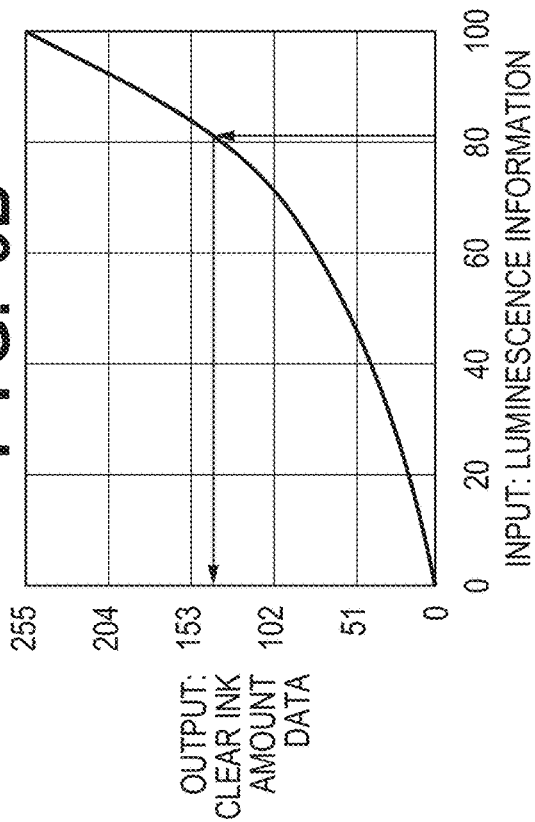
FIG. 9B is a graph showing a relationship when generating clear ink amount data from luminescence information.
Figure 9A:
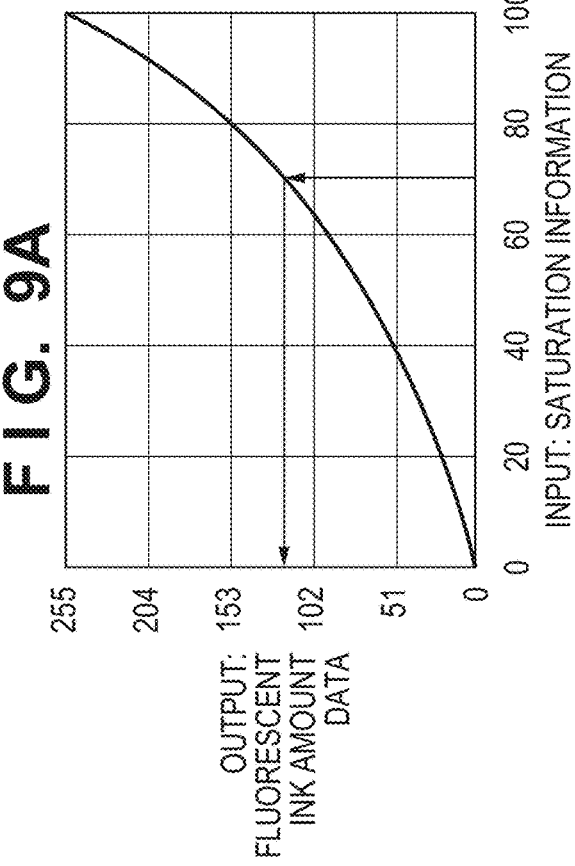
FIG. 9A is a graph showing a relationship when generating fluorescent ink amount data from saturation information.

FIG. 9A is a graph showing a lookup table and its graph when generating fluorescent ink amount data from saturation information. This graph is an inverse function of the graph of the relationship between the fluorescent color material amount and the saturation shown in FIG. 6A, and is a table for looking up a fluorescent ink amount with respect to a saturation information value. For example, when the saturation information value is "70", the fluorescent ink amount is "120". The fluorescent ink amount data at this time is 8-bit image data, "0" means no fluorescent ink, and "255" means a maximum fluorescent ink amount.

FIG. 9B is a graph showing a lookup table and its graph when generating clear ink amount data from luminescence information. This graph is created by reverse lookup of the relationship between the clear ink amount and the luminescence intensity shown in FIG. 6B, and is a table for looking up a clear ink amount with respect to luminescence information. For example, when the luminescence information is "80", the clear ink amount is "150". The clear ink amount data at this time is 8-bit image data, "0" means no clear ink, and "255" means a maximum clear ink amount.

As described with reference to FIG. 6C, the luminescence intensity adjustable range by application of the clear ink changes in accordance with the fluorescent ink application amount. FIG. 6D is a graph for explaining the relationship between the value of luminescence intensity information and the adjustment range. FIG. 6D shows an adjustable range 601 at a fluorescence pink ink application amount of 20 ng, and an adjustable range 602 at a fluorescence pink ink application amount of 10 ng. The luminescence intensity information means a relative value representing 0% to 100% within an adjustable luminescence intensity range corresponding to a fluorescent ink amount when the lower limit within this range is defined as 0 and the upper limit is as 100.

Then, the process advances to step S703, and the CPU 111 performs quantization processing (halftone processing). Here, a clear ink dot is preferably arranged adjacent to a fluorescent ink dot.

When quantization processing is performed by the dither method, the priorities of dot arrangement positions can be equalized using the same threshold matrix. That is, clear ink dots and fluorescent ink dots are arranged to preferentially overlap each other. When quantization processing is performed by the error diffusion method, the priority of whether to arrange the clear ink is decided based on discharge or non-discharge of a fluorescent ink dot by referring to the quantization result of the fluorescent ink. More specifically, for a pixel at which a fluorescent ink dot is discharged, a threshold for deciding discharge or non-discharge of the clear ink is decreased. For a pixel at which no fluorescent ink dot is discharged, the threshold is increased. Hence, a clear ink dot can be preferentially generated at a pixel position at which a fluorescent ink dot is discharged.

Then, the process advances to step S704, and the CPU 111 performs dot arrangement division processing based on the result of quantization in step S703. In this processing, the dot arrangement is so divided as to print 1/N of dots decided in step S704 by N times when forming an image by N scans.

At this time, it is more preferably controlled to apply the clear ink and the fluorescent ink at the same position by the same scanning. More specifically, this can be implemented by performing the dot arrangement division processing using the same dot arrangement division mask for the clear ink and the fluorescent ink. This control can decrease the difference in landing time between the fluorescent ink droplet and the clear ink droplet on the printing medium. Since the area of contact between the fluorescent ink droplet and the clear ink droplet increases, increases in time and volume by which the ink droplets are mixed can be expected, and the luminescence efficiency can be efficiently increased.

In step S705, the CPU 111 controls the printhead 115 to print based on the dot count and dot positions of the fluorescent ink and those of the clear ink decided in step S704. The fluorescent ink and the clear ink are mixed on the printing medium and the luminescence intensity is adjusted, as described above.

By forming an image on the printing medium by the above control, the image in which the saturation and the luminescence intensity are independently controlled can be obtained. By designating the saturation level and the luminescence level via the UI, the user can easily adjust the saturation and the luminescence, and adjust the image quality more intuitively.

Although color information has been described using saturation information of a fluorescence region in the first embodiment, full-color data such as RGB signal value data or CMYK signal value data may be included as color information.

Next, a case in which CMYK data and saturation information of a fluorescence region are simultaneously received as color information in step S701 will be explained. In the case of CMYK data, step S702 is skipped, and the data are quantized in step S703 into cyan ink dot data, magenta ink dot data, yellow ink dot data, and black ink dot data. Further, dot arrangement division is performed in step S704, and the cyan ink, the magenta ink, the yellow ink, and the black ink are applied in step S705 together with the fluorescent ink and the clear ink. Accordingly, an image effectively utilizing fluorescent luminescence can be printed in addition to a full-color image.

Even for RGB data, L*a*b* data, or the like, color conversion processing (multidimensional lookup table processing) represented by an ICC profile is performed. Ink color separation is performed on CMYK ink amount data, and these inks can be applied together with the fluorescent ink and the clear ink, similar to the above-described case.

The color information may be fluorescent ink amount data. In this case, the step of generating a fluorescent ink amount from saturation information step S702 is skipped.

A subtractive color mixing ink may be generated from the clear ink amount and the luminescence wavelength of the fluorescence. Along with an increase in luminescence intensity, the hue slightly changes. To adjust the hue, a small amount of subtractive color mixing inks (C, M, and Y) may be applied. More specifically, the two-dimensional lookup table (2D-LUT) of the fluorescent ink and clear ink amount may be looked up for C, M, and Y ink amounts to be added. It is also possible to measure the change direction of the hue angle and the degree of change, and mix in advance a small amount of color material for hue angle adjustment in the clear ink.

Although luminescence intensity information is set within a range of 0 to 100 in the above-described first embodiment, a negative value such as −50 to 50 can also be set. When a negative value is designated for the luminescence intensity, a weaker luminescence intensity state can be formed than by only the fluorescent ink. To implement this, it is controlled to apply a subtractive color mixing ink (non-fluorescent ink) of the same hue as that of the fluorescent ink to the fluorescence region instead of the clear ink. The multicolor of the fluorescent ink and subtractive color mixing ink has the effect of suppressing the luminescence of the fluorescent ink, as described above. That is, in step S702, it is controlled to generate a subtractive color mixing ink from negative luminescence information and print. At this time, the saturation also changes due to application of the subtractive color mixing ink, so it is more preferable to finely adjust the fluorescent ink amount in order to adjust the saturation. More specifically, this can be implemented by, for example, processing of a two-dimensional lookup table for deriving a subtractive color mixing ink amount and a fluorescent ink amount from the saturation value and the luminescence intensity value.

As described with reference to FIG. 6C, the luminescence intensity adjustable range by application of the clear ink changes depending on the fluorescent ink application amount. However, it may be hard for the user to imagine an actually obtained luminescence intensity. To allow the user to easily reflect his/her intention, there may be provided a function of printing a plurality of patches in which the fluorescent ink amount and the clear ink amount are changed, as shown in FIG. 15. A plurality of patches are arrayed in which the saturation level is changed in the horizontal direction and the luminescence level is changed in the vertical direction. These patches are fitted in the display of the UI, further improving the user friendliness of adjustment.

To increase the probability at which the fluorescent ink and the clear ink contact each other on the paper surface, bold processing may be adopted to widen for each pixel a dot arrangement for discharging the clear ink. In a region where the concentration of the fluorescent ink is low, the number of dots is small, and even if dot arrangement data is so prepared that the fluorescent ink and the clear ink contact each other, the fluorescent ink and the clear ink may not contact each other. More specifically, the fluorescent ink and the clear ink do not actually contact each other owing to a landing position error arising from variations of the mechanical precision, vibrations in printing, or the like.

Figure 10A:
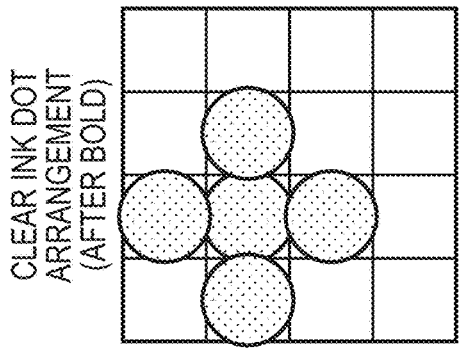
FIGS. 10A to 10C are views for explaining the dot arrangements of the fluorescent ink and clear ink, and widening of the clear ink range.
Figure 10B:
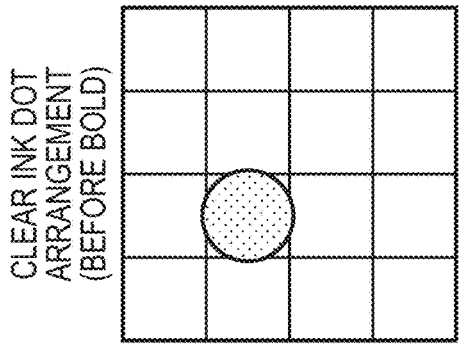
Figure 10C:
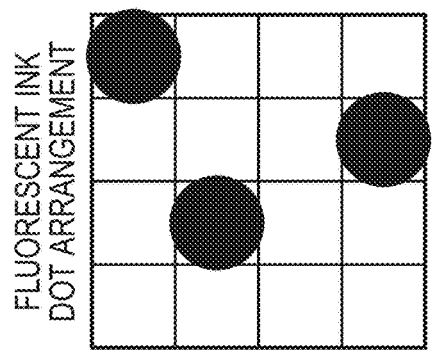

FIG. 10A shows the dot arrangement of the fluorescent ink, and FIG. 10B shows the dot arrangement of the clear ink before bold processing. In a combination of FIGS. 10A and 10B, if the landing position shifts by one pixel, the fluorescent ink and the clear ink may not contact each other. To prevent this, as shown in FIG. 10C, clear ink dots are added by one dot in each of up, down, right, and left directions so that the fluorescent ink and the clear ink can stably contact each other. The example in which one clear ink dot is added in each of the up, down, right, and left directions has been described, but the present invention is not limited to this. For a low-wettability printing medium, several clear ink dots may be added in each of up, down, right, left, and diagonal directions in consideration of the spread of dots.

Carriage scanning in printing may generate vibrations in the whole printing apparatus and disturb the landing position. The vibrations are classified into large vibrations in the horizontal direction with respect to the scanning direction and small vibrations in the vertical direction. To cope with this, it may be controlled to change, between the vertical and horizontal directions, the amount by which dots are increased. Processing of increasing the amount of clear ink at the same dot position may also be performed to increase the contact ratio.

To effectively adjust the luminescence intensity, the color material concentration of the fluorescent ink mounted in the printing apparatus is desirably increased. The luminescence intensity can be adjusted by diluting a color material on a printing medium with a resin contained in the clear ink. As an initial color material concentration is higher, the adjustment range can be set wider.

It may also be configured to change the color material concentration of the fluorescent ink and the resin concentration of the clear ink. In this configuration, inks of a plurality of concentrations are prepared in advance and when the printing apparatus is used, the ink is replaced and used. Generation of the fluorescent ink amount and generation of the clear ink amount in step S702 in this configuration will be explained.

The saturation of an image serving as a printing result is determined by the color material concentration of the fluorescent ink and the coverage of the fluorescent ink on the printing medium surface. The coverage has a substantially linear relationship with the fluorescent ink application amount, so the saturation can be derived from the color material concentration and application amount of the ink. That is, the relationship between the saturation, the color material concentration, and the application amount is stored in a database in advance. Even if a fluorescent ink of a different color material concentration is mounted, the saturation can be properly adjusted. More specifically, the saturation can be controlled using a two-dimensional lookup table for deriving a fluorescent ink application amount from saturation information and a color material concentration of the fluorescent ink that are designated by the user.

The luminescence intensity is determined by the color material density on a printing medium. The color material density is the ratio of a color material to a dry ink, that is, a solid ink film that forms an image on a printing medium. The color material density is represented by color material density=color material amount÷(color material amount+ resin amount). The color material density means that the color material is apparently diluted with a resin. That is, the color material density can be derived from the fluorescent color material concentration, the fluorescent ink amount, and the resin concentration of the clear ink. These pieces of information are stored in a database in advance. Even if a fluorescent ink of a different color material concentration and a clear ink of a different resin concentration are mounted, the luminescence intensity can be appropriately adjusted. For example, the luminescence intensity can be controlled using a three-dimensional lookup table for deriving a clear ink amount from luminescence intensity information, the color material concentration of the fluorescent ink, and the resin concentration of the clear ink that are designated by the user.

As described above, according to the first embodiment, the saturation and luminescence intensity of a fluorescence region can be independently controlled in image formation using a fluorescent ink, and the user can be provided with an environment where he/she can easily adjust the saturation and fluorescent luminescence of the fluorescence color.

Second Embodiment

In the first embodiment, the method of separately accepting color (saturation) information and luminescence information from the user and independently controlling the saturation and the luminescence intensity has been described. In the second embodiment, an example in which the user can control the saturation and the luminescence intensity using only color information such as RGB data will be explained.

In the second embodiment, control of switching between a step of generating only a subtractive color mixing ink amount and a step of generating both a subtractive color mixing ink amount and a fluorescent ink amount will be explained. Note that the arrangement of a printing system, that of a printing apparatus 108, and the like according to the second embodiment are similar to those in the above-described first embodiment, and a description thereof will not be repeated.

Figure 11:
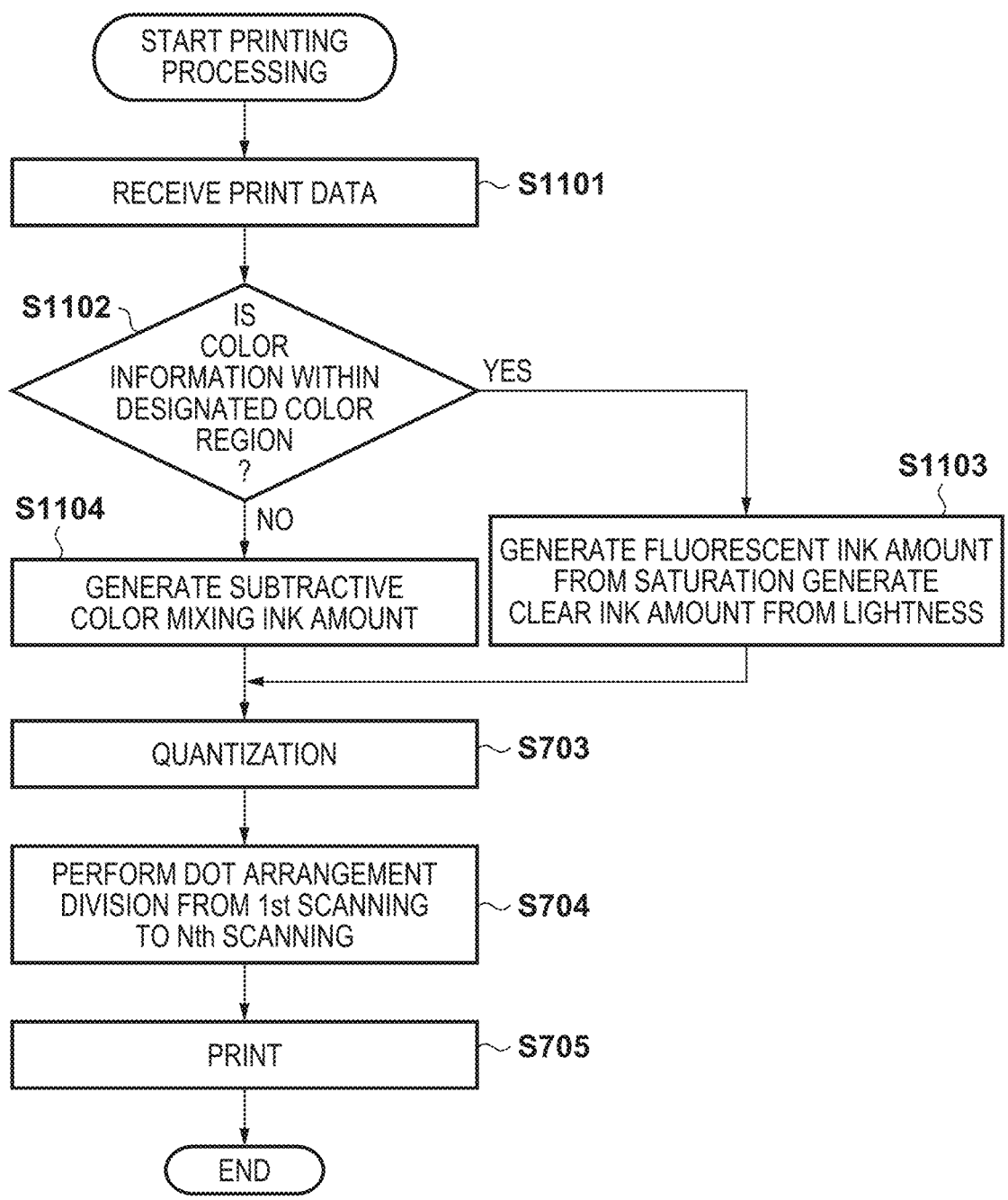
FIG. 11 is a flowchart for explaining printing processing by a printing apparatus according to the second embodiment.

FIG. 11 is a flowchart for explaining printing processing by the printing apparatus 108 according to the second embodiment of the present invention. The processing shown in the flowchart of FIG. 11 is implemented by, for example, deploying a program stored in a ROM 113 into a RAM 112 and executing it by a CPU 111. Note that the processing shown in the flowchart of FIG. 11 may be executed by, for example, an image processing accelerator 109. In FIG. 11, the same reference numerals as those in the above-described flowchart of FIG. 7 denote the same processes, and a description thereof will not be repeated.

In step S1101, the CPU 111 receives print data transmitted from a PC 101. The print data is data including an RGB signal value as color information.

Figure 12:
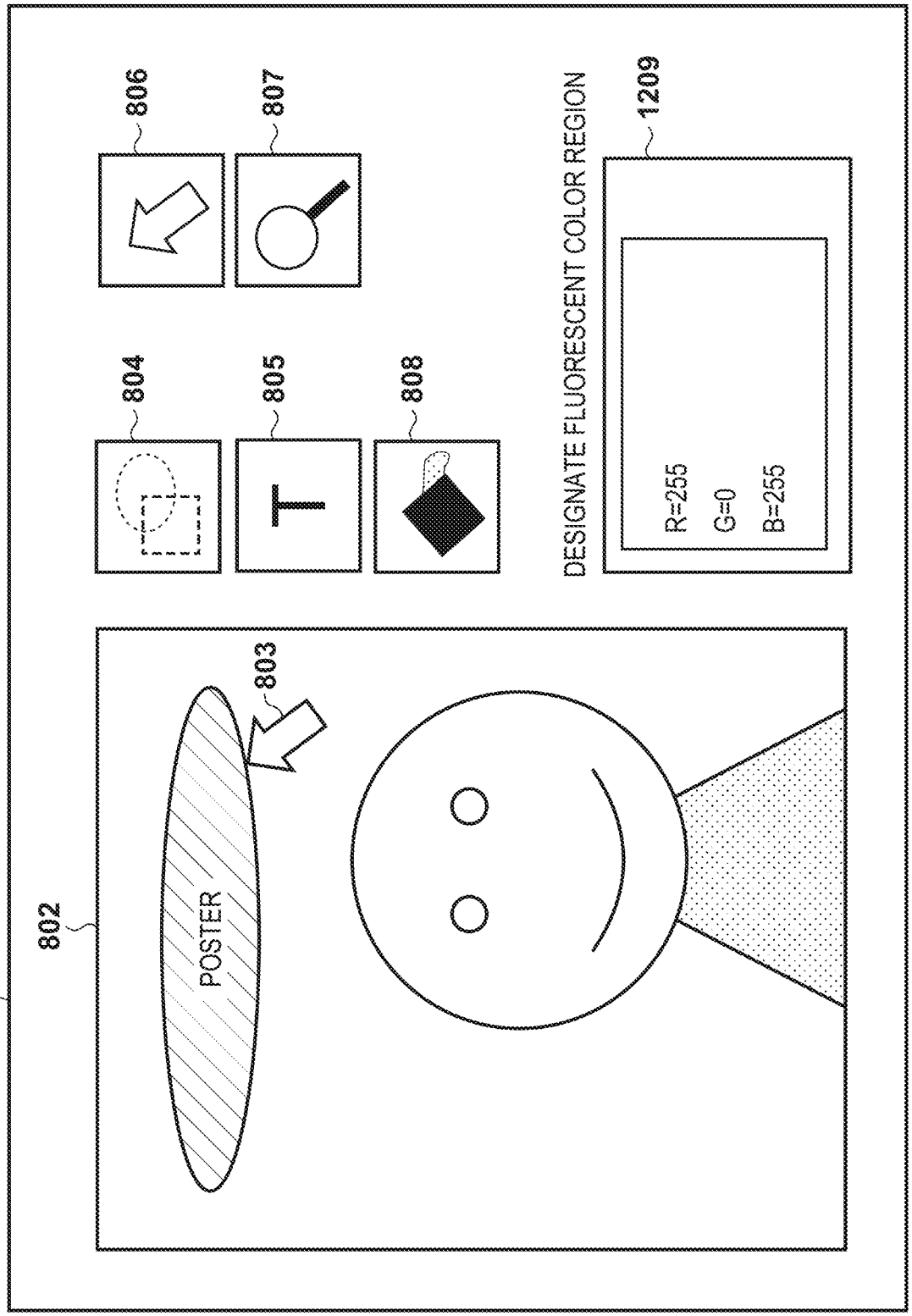
FIG. 12 is a view showing an example of a screen for designating a color region by the user using a PC in the second embodiment.

FIG. 12 is a view showing an example of a screen for designating a color region by the user using the PC 101 in the second embodiment. In FIG. 12, the same reference numerals as those in FIG. 8 denote common portions, and a description thereof will not be repeated.

The user designates an RGB value in a predetermined color region. An RGB value is directly input here, but a patch may be selected. The predetermined color region means values between the white point and the maximum saturation point of a single fluorescent ink color at a hue angle at which the color can be reproduced by the single fluorescent ink color. FIG. 12 shows an example in which the color can be designated by one point in an area 1209.

Then, the process advances to step S1102, and the CPU 111 determines whether the color information included in the print data received in step S1101 falls for each pixel within the user-designated color region that uses the fluorescent ink.

If the color information falls within the user-designated color region, the process advances to step S1103, and the CPU 111 obtains a fluorescent ink amount in accordance with the saturation and obtains a clear ink amount in accordance with the lightness. The clear ink amount can be obtained by calculating, by using a lightness calculated from the RGB value of an input image instead of a luminescence intensity data value, saturation information calculated from the RGB value of the input image instead of a saturation data value in the first embodiment.

If it is determined in step S1102 that the color information falls outside the user-designated color region, the process advances to step S1104, and the CPU 111 generates a subtractive color mixing ink by performing normal color separation processing. This can be performed by processing based on a three-dimensional lookup table for calculating C, M, Y, and K ink amounts from RGB data.

Figure 13:
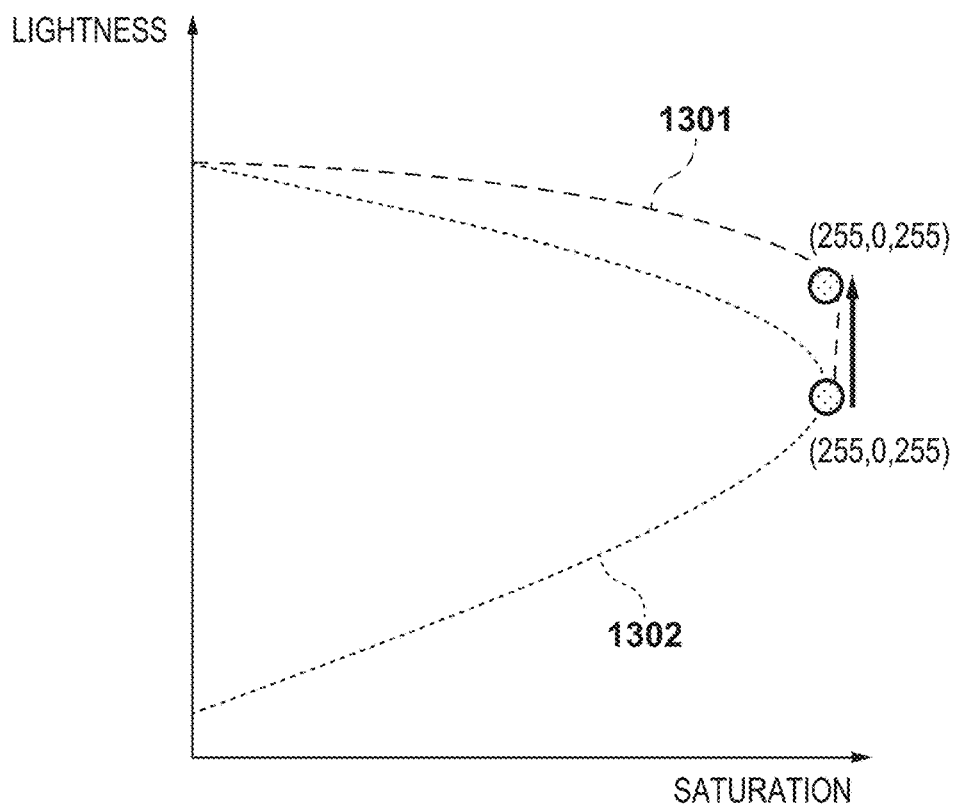
FIG. 13 is a graph showing a color reproduction state when the user designates a fluorescent ink use region (255, 0, 255) as one point color in the second embodiment.

FIG. 13 is a graph showing a color reproduction state when the user designates a fluorescent ink use region (255, 0, 255) as one point color in the second embodiment.

Reference numeral 1301 denotes a color reproduction region when both the fluorescent ink and the clear ink are used; and 1302, a color reproduction region when only the subtractive color mixing ink is used. More specifically, FIG. 13 shows the color reproduction region of the printing apparatus 108 at the hue of magenta pink when the ordinate represents the lightness, the abscissa represents the saturation, and the fluorescence pink ink (FP) and the magenta ink (M) are used. In this case, a color except (255, 0, 255) is reproduced using the subtractive color mixing ink, and (255, 0, 255) designated as one point color is reproduced using the fluorescent ink and the clear ink based on the lightness and the saturation. In FIG. 13, an arrow indicates the rise of the luminescence intensity. The remaining processing is similar to that in the first embodiment.

A predetermined color gamut using the fluorescent ink that is referred to in step S1101 will be explained. The predetermined color gamut depends on the luminescence wavelength of a mounted fluorescent ink. Preferably, a fluorescence blue ink luminescent in the blue region (450 nm to 500 nm) has a color gamut at a hue angle of 180° to 360° in the L*A*B color space. A fluorescence green ink luminescent in the green region (500 nm to 565 nm) has a color gamut at a hue angle of 90° to 270° in the L*A*B color space. A fluorescence yellow ink luminescent in the yellow region (565 nm to 590 nm) has a color gamut at a hue angle of 0° to 180° in the L*A*B color space. A fluorescence orange ink or fluorescence red ink luminescent in the red region (590 nm to 780 nm) has a color gamut at a hue angle of −90° to 90° in the L*A*B color space. In the second embodiment, one fluorescent ink may suffice, but fluorescent inks corresponding to all hue angles are preferably mounted.

Although RGB data has been exemplified as color information in the second embodiment, color information in a standard color space such as L*a*b* or L*C*H* may be used.

Although color designation by one point has been described in the second embodiment, a color region may be designated.

Figure 14:
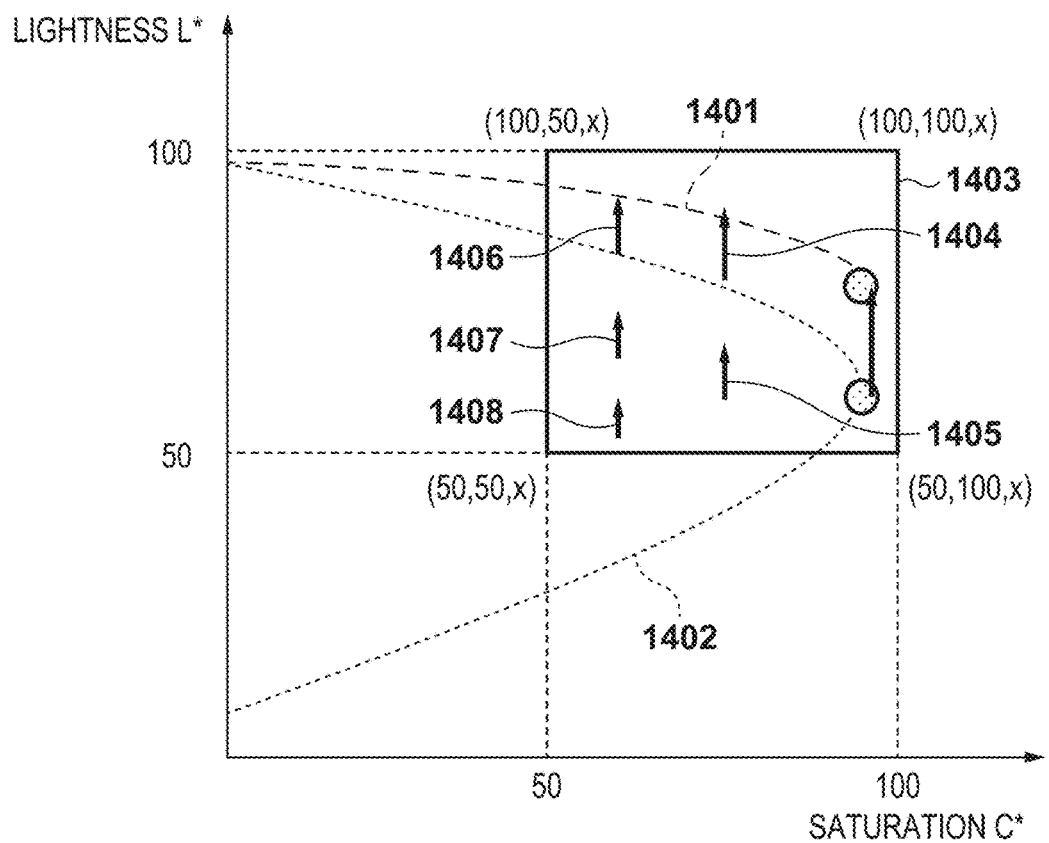
FIG. 14 is a graph showing an example when the range of a color region is designated in the second embodiment.

FIG. 14 is a graph showing an example when the range of a color region is designated in the second embodiment. In this example, the range of a region 1403 of (100, 50, X) to (50, 100, X) is designated in the L*C*H* space. This will be described in detail.

In FIG. 14, reference numeral 1401 denotes a color reproduction region when both the fluorescent ink and the clear ink are used; 1402, a color reproduction region when only the subtractive color mixing ink is used. FIG. 14 shows the color reproduction region of the printing apparatus at the hue of magenta pink when the ordinate represents the lightness, the abscissa represents the saturation, and the fluorescence pink ink (FP) and the magenta ink (M) are used. The region 1403 represents the range of the color region designation. This range is near −30° to 30° at a hue angle X of the fluorescent P ink. It is controlled to reproduce a color in the region 1403 by the fluorescent ink and the clear ink in accordance with a saturation and lightness corresponding to color information of an input image.

For example, when the user wants to adjust only the luminescence intensity while maintaining the saturation, he/she can control it by increasing/decreasing only the L* value. In FIG. 14, arrows 1404 to 1408 indicate magnitudes of the luminescence effect when the input L* is changed with respect to the color of the same saturation. As for the arrows 1404 and 1405 at the same saturation, the clear ink is controlled to greatly increase the luminescence intensity in a higher lightness region, as indicated by, for example, the arrow 1404. Similarly, as for the arrows 1406, 1407, and 1408 at the same saturation, the clear ink is controlled to increase the luminescence intensity more greatly as represented by the arrow 1407 than by the arrow 1408, or as represented by the arrow 1406 than by the arrow 1407.

In a low-saturation, low-lightness region, the subtractive color mixing ink may be further added to print while suppressing the luminescence intensity of the fluorescent ink.

Although the method of designating a fluorescence use color region has been described, switching processing using only a check box of whether to use the fluorescent ink may be performed without designating the color region. In this case, if "ON" is checked to use the fluorescent ink, the entire color region is subjected to processing, it is controlled to effectively use the fluorescent ink in the hue region of the fluorescent ink, and printing is performed using only the subtractive color mixing ink in a hue region other than the hue region of the fluorescent ink.

As described above, according to the second embodiment, the user can input image data such as RGB or CMYK and perform simple settings, obtaining an output result in which the saturation and the luminescence are controlled. The user can effectively use the fluorescent ink and the clear ink from only color information of the image for a color region in which the fluorescent ink can exert the effect, thereby obtaining an output result in which the saturation and the luminescence are controlled.

As described above, according to the second embodiment, the density of the fluorescent color material per unit area can be decreased by a resin-containing ink without changing the fluorescent color material amount per unit area. By decreasing the density of the fluorescent color material, concentration quenching is relaxed and the luminescence intensity is increased. However, the fluorescent color material amount does not change, and no saturation changes. As a result, the saturation can be controlled by the application amount of the fluorescent ink, and the luminescence intensity can be controlled by the application amount of the resin-containing ink.

Third Embodiment

In the first embodiment, the method of separately accepting color information (including the saturation) and luminescence information from the user and independently controlling the saturation and the luminescence intensity has been described. In the third embodiment, the clear ink amount is decided in accordance with the fluorescent ink application amount and luminescence intensity information. Therefore, a luminescence intensity the user wants can be obtained.

Figure 16:
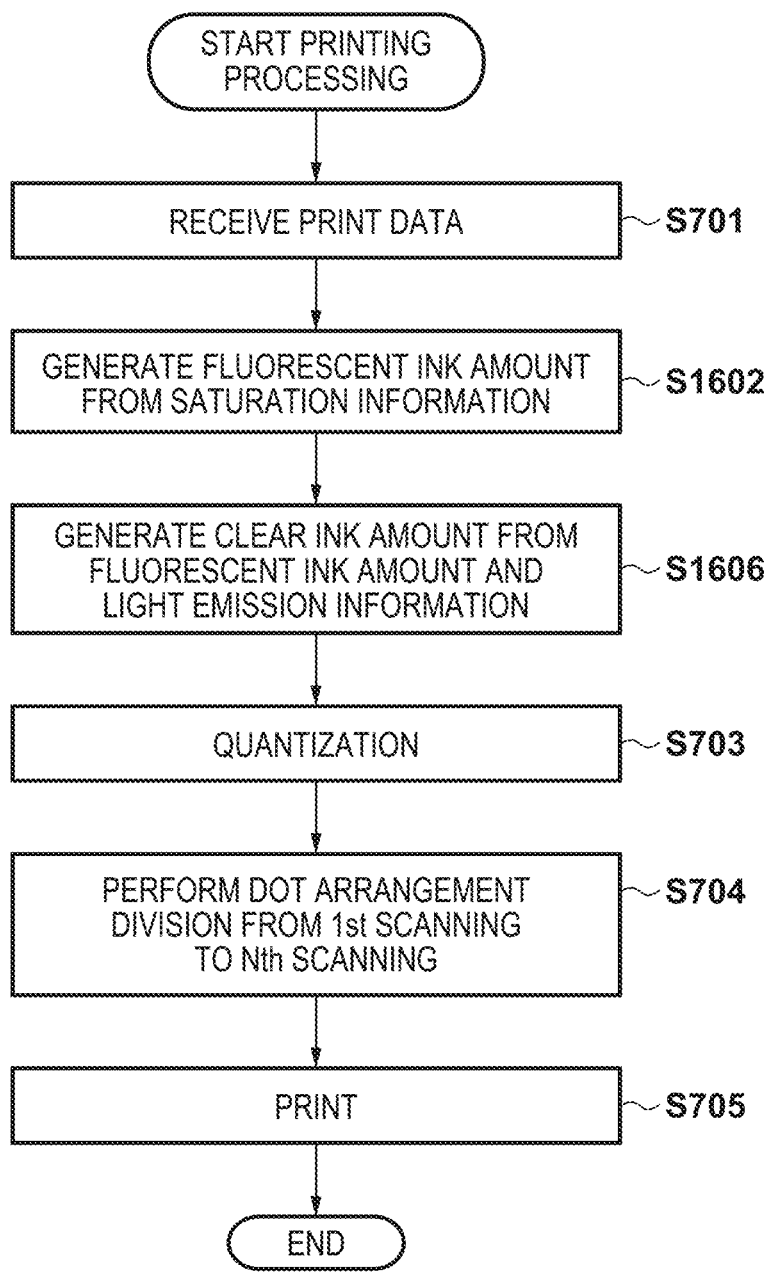
FIG. 16 is a flowchart for explaining printing processing by a printing apparatus according to the third embodiment.

FIG. 16 is a flowchart for explaining printing processing by a printing apparatus 108 according to the third embodiment. In FIG. 16, the same reference numerals as those in the above-described flowchart of FIG. 7 denote the same processes, and a description thereof will not be repeated.

In step S701, a CPU 111 receives print data transmitted from a PC 101. The print data includes saturation information of a fluorescence use region as color information, and luminescence intensity data of the fluorescence use region as luminescence information.

Figure 17:
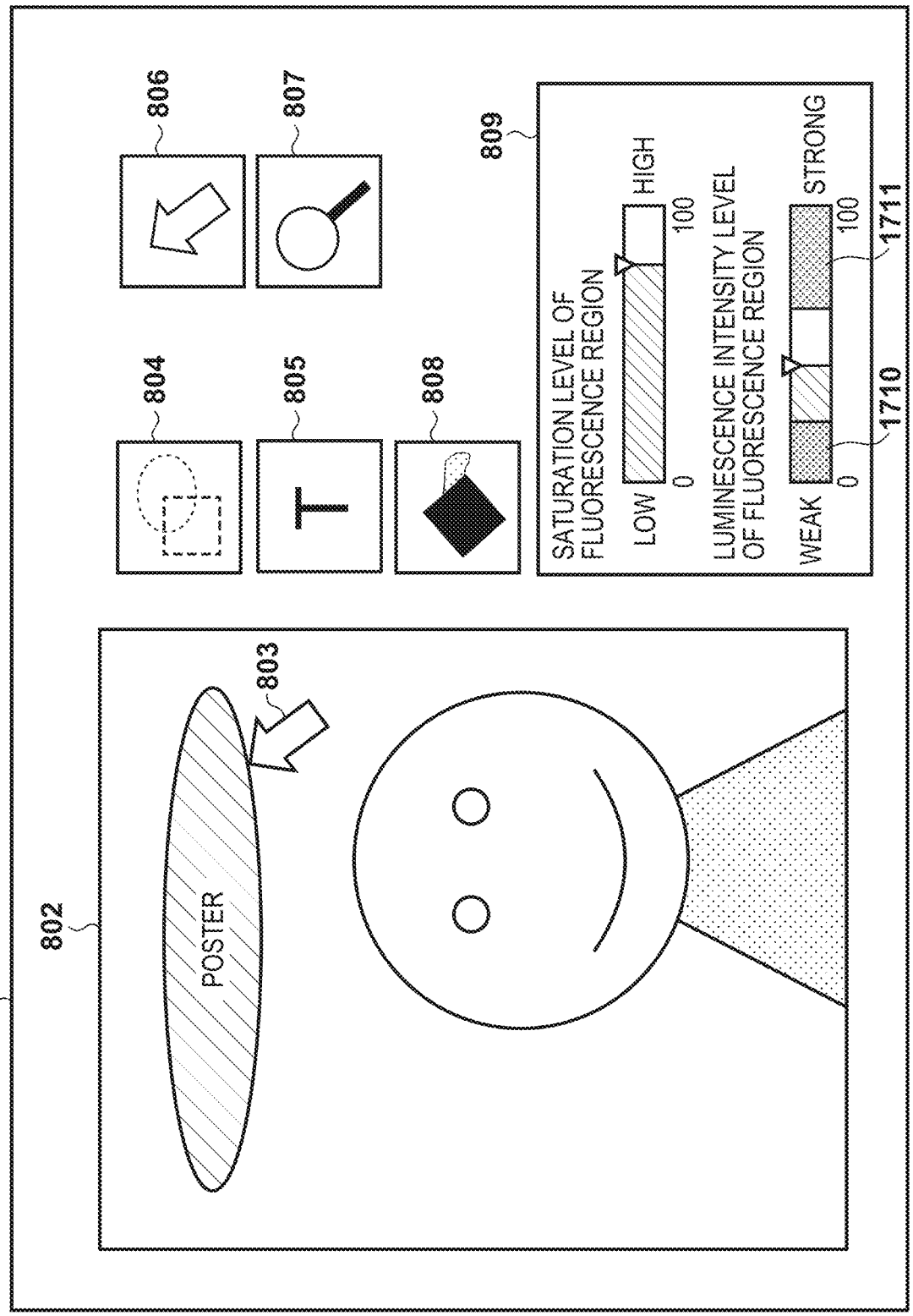
FIG. 17 is a view showing an example of a screen for designating saturation information and luminescence information by the user using a PC in the third embodiment.

FIG. 17 is a view showing a UI for designating saturation information and luminescence information by the user using the PC 101 in the third embodiment. As described with reference to FIG. 8 in the first embodiment, the user can designate, by using slider bars in an area 809 via the screen of the UI, the saturation and luminescence intensity of a portion the user wants to print in fluorescence. The saturation level and the luminescence intensity level are designated using a saturation level change slide bar and a luminescence intensity level change slide bar displayed in the area 809. The PC 101 transmits a saturation level designated by the user as saturation information and a luminescence intensity level designated by the user as luminescence information.

Since a luminescence intensity adjustable range changes depending on the fluorescent ink amount, no luminescence intensity may be obtained depending on a combination selected by the user. To prevent this, the adjustment range is restricted and displayed on the UI in FIG. 17. The user friendliness is improved by displaying the adjustable range to the user. In FIG. 17, hatched regions 1710 and 1711 are regions where no slider bar can be moved, that is, no level can be selected.

Figure 18A:
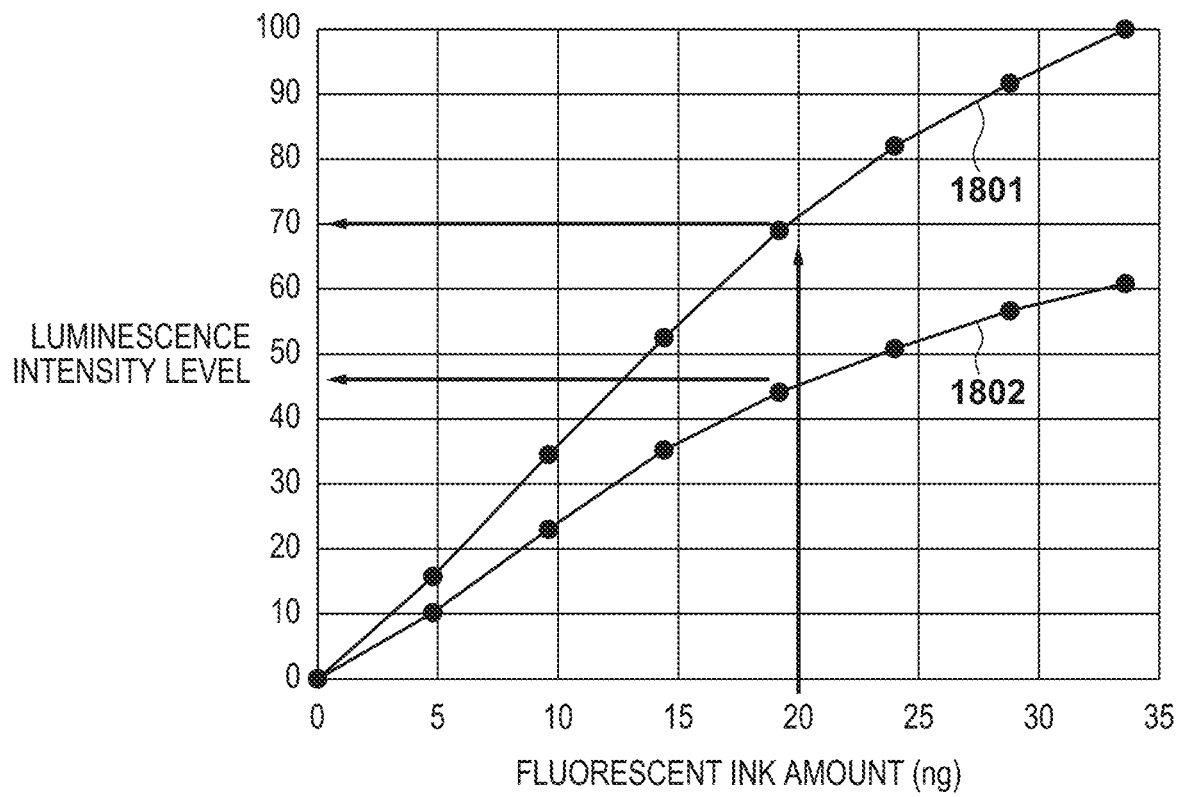
FIG. 18A is a graph for explaining control of calculating the upper and lower limits of the luminescence intensity level from the fluorescent ink amount in the third embodiment.

In the embodiment, the relationship between the fluorescent ink amount, the clear ink amount, and the luminescence intensity shown in FIG. 6D is obtained in advance. Then, a lookup table representing the correlation between the saturation and the luminescence intensity in FIG. 18A is calculated and held as a database in the printing apparatus. When the user designates a saturation level, the lookup table is looked up to specify a range where the luminescence intensity is adjustable, that is, lower and upper limit values, and reflect them in the UI display. Reference numeral 1801 denotes an upper limit value; and 1802, a lower limit value. In this example, the upper limit value of the luminescence intensity level at a fluorescent ink amount of 20 ng is "70", and the lower limit value is "47".

When a luminescence intensity designated by the user is not obtained, a warning to that effect may be output.

In step S1602, the CPU 111 decides a fluorescent ink amount based on the input saturation information. As described above, this processing is performed by one-dimensional lookup table processing shown in FIG. 9A. Note that although saturation information is input in the above example, a fluorescent ink amount may be directly input. In this case, step S1602 is skipped.

Figure 18B:
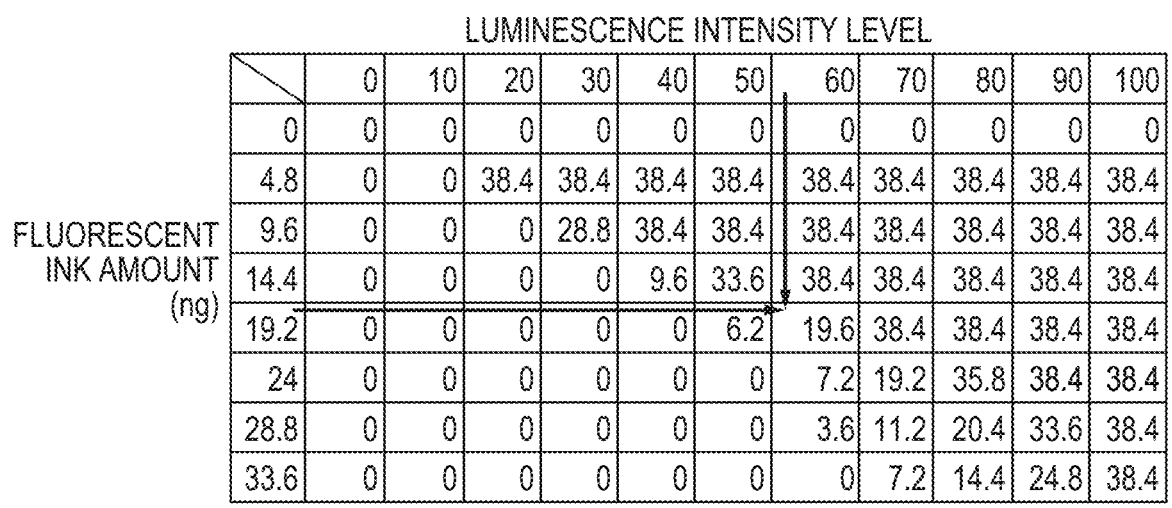
FIG. 18B is a table for explaining a two-dimensional lookup table when generating clear ink amount data from the fluorescent ink amount and the designated luminescence intensity.

In step S1606, the CPU 111 decides a clear ink amount based on the fluorescent ink amount decided in step S1602 and input luminescence intensity information by using the lookup table shown in FIG. 18B. FIG. 18B shows a two-dimensional lookup table for deriving a clear ink amount from the fluorescent ink amount and the luminescence intensity. The lookup table is held in advance in the internal memory of the printing apparatus. The lookup table in FIG. 18B can be created by obtaining the relationship between the fluorescent ink amount, the clear ink amount, and the luminescence intensity as shown in FIG. 6D. For example, when a fluorescent ink amount of 14.4 ng and a luminescence intensity level of 60 are designated, a decided clear ink amount is 19.6 ng.

By executing the processes in steps S703 to S705 based on the decided clear ink amount, the fluorescent ink and the clear ink are applied to print an image on a printing medium.

As described above, according to the third embodiment, a luminescence intensity corresponding to a saturation can be properly controlled to obtain an output result the user wants.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2022-036407, filed Mar. 9, 2022 and No. 2023-021872, filed Feb. 15, 2023 which are hereby incorporated by reference herein in their entirety.

What is claimed is:

1. A printing apparatus comprising:
at least one of one or more circuits and one or more processors and at least one memory, the at least one memory being coupled to the one or more processors and having stored thereon instructions executable by the one or more processors, wherein at least one of the one or more circuits or the execution of the instructions cause the printing apparatus to function as:
a printing unit configured to print an image by applying, onto a printing medium, a first ink containing a fluorescent color material and a second ink containing not fluorescent color material but a resin;
a decision unit configured to determine an amount of the second ink applied to a unit area on the printing medium based on an amount of the first ink applied to the unit area and luminescence information representing a luminescence intensity; and
a control unit configured to control an application operation of the first ink and the second ink by the printing unit based on the amount of the first ink and the amount of the second ink applied to the unit area.

2. The apparatus according to claim 1, wherein the decision unit determines the amount of the first ink applied to the unit area based on color information included in print data.

3. The apparatus according to claim 1, wherein the decision unit determines the amount of the first ink applied to the unit area based on information that is included in print data and represents a saturation.

4. The apparatus according to claim 1, wherein the decision unit determines the amount of the first ink in the unit area in accordance with a saturation of color information included in a color region where the first ink is applied based on print data, and
the luminescence information is obtained based on a lightness of the color information included in the color region.

5. The apparatus according to claim 1, wherein the luminescence information includes at least one of information about a luminescence intensity and a use region of the first ink, and information about the amount of the second ink.

6. The apparatus according to claim 1, wherein the control unit controls arrangements of a first dot of the first ink and a second dot of the second ink to bring the first dot and the second dot in contact with each other on the printing medium.

7. The apparatus according to claim 1, wherein the printing unit prints an image by a plurality of scans with respect to the printing medium, and
the control unit controls the printing unit to arrange a dot of the second ink at one of a position where the dot of the second ink overlaps a dot arrangement of the first ink applied by same scanning of the printing unit, and a position where the dot of the second ink is adjacent to the dot arrangement of the first ink.

8. The apparatus according to claim 1, wherein the printing unit can further apply a third ink containing a color material different from the first ink, and
the decision unit determines an amount of the third ink in accordance with a luminescence wavelength of the first ink and the amount of the second ink.

9. The apparatus according to claim 1, wherein the control unit further arranges a dot of the second ink to increase an ink amount with respect to the amount of the second ink or widen the dot.

10. The apparatus according to claim 1, wherein the second ink is a clear ink containing no color material.

11. The apparatus according to claim 8, wherein the third ink is an ink containing a color material other than fluorescence.

12. The apparatus according to claim 11, wherein the third ink is one of a cyan ink, a magenta ink, and a yellow ink.

13. The apparatus according to claim 1, wherein the printing unit includes a plurality of orifices for discharging the first ink, and a plurality of orifices for discharging the second ink.

14. A printing system comprising:
a printing apparatus; and
an information processing apparatus configured to transmit print data to the printing apparatus and print,
the printing apparatus including at least one of one or more circuits and one or more processors and at least one memory, the at least one memory being coupled to the one or more processors and having stored thereon instructions executable by the one or more processors, wherein at least one of the one or more circuits or the execution of the instructions cause the printing apparatus to function as:
a printing unit configured to print an image by applying, onto a printing medium, a first ink containing a fluorescent color material and a second ink containing not fluorescent color material but a resin;
a decision unit configured to determine an amount of the second ink applied to a unit area on the printing medium based on an amount of the first ink applied to the unit area and luminescence information representing a luminescence intensity; and
a control unit configured to control an application operation of the first ink and the second ink by the printing unit based on the amount of the first ink and the amount of the second ink applied to the unit area, and
the information processing apparatus including at least one of one or more circuits and one or more processors and at least one memory, the at least one memory being coupled to the one or more processors and having stored thereon instructions executable by the one or more processors, wherein at least one of the one or more circuits or the execution of the instructions cause the information processing apparatus to function as:
a setting unit configured to set color information and luminescence information of the image printed based on the print data, or a color region using the first ink; and
a transmission unit configured to transmit, to the printing apparatus, the print data including the color information and the luminescence information, or information representing the color region that is set by the setting unit.

15. The system according to claim 14, wherein the setting unit sets the color information and the luminescence information, or the color region by inputting a numerical value, operating a slider bar, or selecting a patch.

16. A control method comprising:
printing an image by applying, onto a printing medium, a first ink containing a fluorescent color material and a second ink containing not fluorescent color material but a resin;
determining an amount of the second ink applied to a unit area on the printing medium based on an amount of the first ink applied to the unit area and luminescence information representing a luminescence intensity; and
controlling an application operation of the first ink and the second ink by a printing unit based on the amount of the first ink and the amount of the second ink applied to the unit area.

17. The method according to claim 16, wherein the amount of the first ink applied to the unit area is determined based on color information included in print data.

18. The method according to claim 16, wherein the amount of the first ink applied to the unit area is decided based on information that is included in print data and represents a saturation.

19. The method according to claim 16, wherein the amount of the first ink in the unit area is determined in accordance with a saturation of color information included in a color region where the first ink is applied based on print data, and
the luminescence information is obtained based on a lightness of the color information included in the color region.

20. The method according to claim 16, wherein arrangements of a first dot of the first ink and a second dot of the second ink are controlled to bring the first dot and the second dot in contact with each other on the printing medium.

21. The method according to claim 16, wherein a third ink containing a color material different from the first ink can be applied, and
an amount of the third ink is determined in accordance with a luminescence wavelength of the first ink and the amount of the second ink.

22. The method according to claim 16, wherein the second ink is a clear ink containing no color material.

23. The method according to claim 21, wherein the third ink is an ink containing a color material other than fluorescence.

24. An image processing apparatus comprising:
at least one of one or more circuits and one or more processors and at least one memory, the at least one memory being coupled to the one or more processors and having stored thereon instructions executable by the one or more processors, wherein at least one of the one or more circuits or the execution of the instructions cause the image processing apparatus to function as:

a decision unit configured to determine, based on an amount of a first ink that is applied to a unit area on a printing medium and contains a fluorescent color material, and luminescence information representing a luminescence intensity, an amount of a second ink that is applied to the unit area and contains not fluorescent color material but a resin; and a control unit configured to control dot arrangements of the first ink and the second ink based on the amount of the first ink and the amount of the second ink applied to the unit area, wherein the control unit controls arrangements of a first dot of the first ink and a second dot of the second ink to bring the first dot and the second dot in contact with each other on the printing medium.

25. An image processing method comprising:

determining, based on an amount of a first ink that is applied to a unit area on a printing medium and contains a fluorescent color material, and luminescence information representing a luminescence intensity, an amount of a second ink that is applied to the unit area and contains not fluorescent color material but a resin; and controlling dot arrangements of the first ink and the second ink based on the amount of the first ink and the amount of the second ink applied to the unit area, wherein arrangements of a first dot of the first ink and a second dot of the second ink are controlled to bring the first dot and the second dot in contact with each other on the printing medium.

* * * * *